United States Patent
Berggren et al.

(10) Patent No.: US 12,513,031 B2
(45) Date of Patent: Dec. 30, 2025

(54) GENERATION AND RECEPTION OF SIGNALS COMPRISING CYCLICALLY SHIFTED ORTHOGONAL BASIS FUNCTIONS

(71) Applicant: HUAWEI TECHNOLOGIES CO., LTD., GuangDong (CN)

(72) Inventors: Fredrik Berggren, Kista (SE); Branislav M. Popovic, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 18/067,469

(22) Filed: Dec. 16, 2022

(65) Prior Publication Data
US 2023/0128676 A1    Apr. 27, 2023

Related U.S. Application Data

(63) Continuation of application No. PCT/EP2021/061048, filed on Apr. 28, 2021.

(30) Foreign Application Priority Data

Jun. 19, 2020 (WO) ............... PCT/EP2020/067056

(51) Int. Cl.
*H04L 27/26* (2006.01)
*H04L 27/10* (2006.01)

(52) U.S. Cl.
CPC ........ *H04L 27/2613* (2013.01); *H04L 27/103* (2013.01)

(58) Field of Classification Search
CPC ............. H04J 2013/0037; H04J 13/004; H04J 13/0059; H04J 13/0062; H04J 13/0066; H04L 27/10; H04L 27/103; H04L 27/26; H04L 27/2613; H04L 27/2634; H04L 27/2636; H04L 27/2639; H04L 27/264; H04L 27/26412

See application file for complete search history.

(56) References Cited

U.S. PATENT DOCUMENTS 6,804,307 B1 * 10/2004 Popovic ................ H04L 1/0618
375/295
8,144,819 B2 * 3/2012 Baldemair .......... H04L 27/2675
375/343

(Continued)

FOREIGN PATENT DOCUMENTS

CN    102224719 A    10/2011

OTHER PUBLICATIONS

Huang et al., Multicarrier Chirp-Division Multiplexing for Wireless Communications, arXiv, 18 pages, Jan. 17, 2019.*

(Continued)

*Primary Examiner* — Frank Duong
(74) *Attorney, Agent, or Firm* — Rimon PC

(57) ABSTRACT

Various embodiments of this disclosure relate to generation and reception of signals comprising cyclically shifted basis functions. A device may obtain a set of modulation symbols and modulate a plurality of basis functions based on the set of modulation symbols to generate a signal. The plurality of basis functions may comprise cyclically shifted versions of a basis function and a periodic autocorrelation function of the basis function may comprise an ideal (e.g., perfect) periodic autocorrelation function.

20 Claims, 15 Drawing Sheets

(56) References Cited

U.S. PATENT DOCUMENTS

| | | | | |
|---|---|---|---|---|
| 8,254,367 | B2* | 8/2012 | Popovic | H04J 3/0682 370/350 |
| 8,856,628 | B2* | 10/2014 | Lakkis | H04B 1/707 375/147 |
| 9,084,269 | B2* | 7/2015 | Tabet | H04L 27/2636 |
| 10,285,092 | B2* | 5/2019 | Mauritz | H04W 28/065 |
| 10,404,514 | B2* | 9/2019 | Rakib | H04L 1/06 |
| 11,817,942 | B2* | 11/2023 | Canonici | H04J 13/0074 |
| 11,943,088 | B2* | 3/2024 | Popovic | H04L 5/0051 |
| 2008/0316961 | A1* | 12/2008 | Bertrand | H04W 24/02 370/329 |
| 2009/0109919 | A1* | 4/2009 | Bertrand | H04W 74/0883 370/329 |
| 2014/0269843 | A1* | 9/2014 | Schaffner | H04B 1/69 375/139 |
| 2021/0111938 | A1* | 4/2021 | Sahin | H04L 27/2626 |

OTHER PUBLICATIONS

Li et al., Communication-embedded OFDM chirp waveform for delay-Doppler radar, IET Radar Sonar Navig., 2018, vol. 12 Iss. 3, pp. 353-360.*

Berggren et al., Joint Radar and Communications With Multicarrier Chirp-Based Waveform, IEEE ComSoc, 17 pages, Oct. 11, 2022.*

Kim et al., A Novel OFDM Chirp Waveform Scheme for Use of Multiple Transmitters in SAR, IEEE, 5 pages, May 2013.*

Berggren et al., Chirp-Convoled Data Transmission, IEEE, 5 pages, Apr. 2021.*

Bhatt, Sequences with Perfect Periodic Auto and Cross Correlation Properties, IETA, 8 pages, Jun. 2020.*

Popovic, Generalized Chirp-Like Polyphase Sequences with Optimum Correlation Properties, IEEE, 4 pages, Jul. 1992.*

Popovic, Complementary Sets of Chirp-Like Polyphase Sequences, Electronic Letters, Jan. 31, 1991.*

Panasonic, "PUCCH modulation for multi sequence transmission", 3GPP Draft; R1-073634, Aug. 15, 2007, XP050107231.total 16 pages.

Yang Liu et al, "A Study on Quasi-orthogonal-ary Chirp Modulation", Chinese Journal of Electronics, Technology Exchange Ltd., Hong Kong, HK, vol. 28, No. 5, Sep. 1, 2019 (Sep. 1, 2019), p. 1053-1058.

F. Berggren and B. M. Popovic Chirp convolved data transmission , to appear in IEEE Commun. Lett.Apr. 2021. Total 5 pages.

Nokia et al., "Data-non-associated control signal transmission without UL data", 3GPP Draft; R1-071676,Apr. 3, 2007,XP050105599. total 6 pages.

Puzyrev Pavel I et al, "Orthogonal Multiple Chirp Modulation for Tasks of Robust Data Transmission", 2018 19th International Conference of Young Specialists on Micro/Nanotechnologies and Electron Devices (EDM), IEEE,Jun. 29, 2018 (Jun. 29, 2018), p. 6403-6408,XP033386523.

LG Electronics Inc, "Consideration on control channel multiplexing structure with/without Sounding RS", 3GPP Draft; R1-072358,May 2, 2007,XP050106087,total 6 pages.

Berggren Fredrik et al, "Chirp-Convolved Data Transmission", Dec. 7, 2020 (Dec. 7, 2020), vol. 25, No. 4, p. 1226-1230,XP011848915.

Ju Y et al, "A new efficient chirp modulation technique for multi-user access communications systems", May 17, 2004, p. 937-940,XP010718714.

Cellini V et al, "A Multicarrier Architecture Based Upon the Affine Fourier Transform", IEEE Transactions on Communications, IEEE Service Center, Piscataway, NJ. USA, vol. 53, No. 5, May 1, 2005 (May 1, 2005), p. 853-862,XP011132139.

Ouyang Xing et al, "Orthogonal Chirp Division Multiplexing", Sep. 1, 2016 (Sep. 1, 2016), vol. 64, No. 9, p. 3946-3957,XP011622759.

* cited by examiner

GENERATION AND RECEPTION OF SIGNALS COMPRISING CYCLICALLY SHIFTED ORTHOGONAL BASIS FUNCTIONS

CROSS-REFERENCE TO RELATED APPLICATIONS

This application is a continuation of International Application No. PCT/EP2021/061048, filed on Apr. 28, 2021, which claims priority to International Application No. PCT/EP2020/067056, filed on Jun. 19, 2020. The disclosures of the aforementioned applications are hereby incorporated by reference in their entireties.

TECHNICAL FIELD

The present disclosure generally relates to the field of wireless communications. In particular, some embodiments of the disclosure relate to generation and reception of signals comprising cyclically shifted basis functions.

BACKGROUND

Conventionally, orthogonal frequency division multiplexing (OFDM) utilizes subcarriers for transmission and provides for an efficient, yet simple and realizable, transmission method over fading radio channels. However, there is a tradeoff between its ability to handle time selective fading and frequency selective fading. A small subcarrier frequency spacing offers a large number of subcarriers and therefore better resilience towards frequency selective fading due to gains from channel coding and interleaving. On the other hand, a large subcarrier frequency spacing offers a short symbol duration and therefore better resilience towards time selective fading and Doppler effects. This may, however, come with a larger overhead due to a cyclic prefix, which may be added before each OFDM symbol to avoid inter-symbol interference (ISI). Transmission systems may be required to enable communications in channels with very large Doppler spread, e.g., for high-speed train scenarios with velocities up to 500 km/h or non-terrestrial networks involving low earth orbit (LEO) satellite links. For future communication networks it may be envisaged that waveforms capable of both radar imaging and communications are desirable, for example, for applications requiring precise positioning.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective of the present disclosure to provide a generalized orthogonal waveform in particular for, but not limited to, time-frequency selective channels. The foregoing and other objectives may be achieved by the features of the independent claims. Further implementation forms are apparent from the dependent claims, the description, and the drawings.

According to a first aspect, a device is provided for generating a signal. The device may be configured to obtain a set of modulation symbols, and modulate a plurality of basis functions based on the set of modulation symbols to generate the signal. The plurality of basis functions comprise cyclically shifted versions of a basis function, wherein a periodic autocorrelation function of the basis function comprises an ideal (perfect) periodic autocorrelation function. This solution improves transmission performance in time-frequency selective channels and reduces complexity at a transmitter.

According to an implementation form of the first aspect, the basis function may comprise a Björck sequence, a Frank sequence, a generalized chirp-like sequence (GCL), a Zad-off-Chu sequence, a constant amplitude zero-autocorrelation (CAZAC) sequence, a modulatable CAZAC sequence, or a binary-to-biphase transformation of a maximum length sequence. This solution reduces transmitter complexity for example when compared to signals generated based on a chirp signal as the basis function.

According to an implementation form of the first aspect, the plurality of basis functions may exclude a chirp signal configured with a phase being variable based on a bivariate quadratic polynomial including a zeroth degree coefficient which is dependent on a maximum number of the plurality of basis functions. This solution avoids use of a particular type of chirp signal having a relatively high complexity. In other words, the plurality of basis functions may exclude chirps generated by orthogonal chirp division multiplexing (OCDM).

According to an implementation form of the first aspect, the plurality of basis functions may exclude a chirp signal configured with a phase being variable based on a bivariate quadratic polynomial including any zeroth degree coefficient or wherein the zeroth degree coefficient is equal to zero. This solution avoids use of a particular type of chirp signal having a relatively high complexity. In other words, the plurality of basis functions may exclude chirps generated by chirp convolved data transmission (CCDT).

According to an implementation form of the first aspect, the basis function may comprise a chirp signal configured with a phase being variable based on a bivariate quadratic polynomial $p(m, n)=\alpha m^2+\alpha n^2-2\alpha nm+\beta n-\beta m+\gamma$ of a modulation symbol index m and a basis function time index n=0, 1, ..., N−1, where $\alpha$, $\beta$ and $\gamma$ are real-valued coefficients. A zeroth degree coefficient $\gamma$ is independent of the maximum number of the plurality of basis functions, and wherein N is an integer, where N is larger than or equal to a number of the set of modulation symbols. This solution improves transmission performance in time-frequency selective channels with a chirp signal as the basis function.

According to an implementation form of the first aspect, the device may be further configured to sum the plurality of modulated basis functions. This solution enables orthogonally multiplexing the modulated basis functions.

According to an implementation form of the first aspect, the device may be further configured to generate the signal s[n] in a time domain based on a circular convolution $$s[n] = \sum_{m=0}^{N-1} x[m]g_{TX}[n-m(\mathrm{mod}N)],$$

where x[m] comprises the set of modulation symbols, $g_{TX}[n-m(\mathrm{mod}\ N)]$ is an mth cyclically shifted basis function, and wherein the basis function $g_{TX}[n]$, n=0, 1, ..., N−1, satisfies $$\sum_{n=0}^{N-1} g_{TX}[n+t(\mathrm{mod}\ N)]g_{TX}^*[n] = \sum_{n=0}^{N-1} |g_{TX}[n]|^2 \cdot \delta[t],$$

where $\delta[k]$ is a Kronecker delta function $\delta[k]=1$ for $k=0$ and $\delta[k]=0$ for $k\neq 0$, m is a modulation symbol index, and t is an integer, $(\cdot)^*$ is a complex conjugate operator, (mod N) is a modulo-N operator, $|\cdot|$ denotes absolute value. This solution enables time-domain implementation with low complexity for generating the signal, in order to improve transmission performance in time-frequency selective channels.

According to an implementation form of the first aspect, the device may be further configured to generate the signal s[n] in a time domain based on a convolution $$s[n] = \sum_{m=0}^{N-1} x[m]g_{TX}[n-m],$$

where x[m] comprises the set of modulation symbols, $g_{TX}[n-m]$ is an mth cyclically shifted basis function, and wherein the basis function $g_{TX}[n]$, $n=0, 1, \ldots, N-1$, satisfies $$\sum_{n=0}^{N-1} g_{TX}[n+t(\mathrm{mod}\ N)]g_{TX}^*[n] = \sum_{n=0}^{N-1} |g_{TX}[n]|^2 \cdot \delta[t],$$

where $\delta[k]$ is a Kronecker delta function $\delta[k]=1$ for $k=0$ and $\delta[k]=0$ for $k\neq 0$, m is a modulation symbol index, and t is an integer, $(\cdot)^*$ is a complex conjugate operator, (mod N) is a modulo-N operator, $|\cdot|$ denotes absolute value, and wherein the basis function $g_{TX}[n]$ satisfies $g_{TX}[n]=g_{TX}[n\pm N]$, where N is an integer and where N is larger than or equal to a number of the set of modulation symbols. This solution enables time-domain implementation with low complexity for generating the signal, in order to improve transmission performance in time-frequency selective channels.

According to an implementation form of the first aspect, the device may be further configured to transform the set of modulation symbols into a frequency domain. The device may be further configured to filter the set of transformed modulation symbols based on a multiplication of the set of transformed modulation symbols with a frequency domain transmit filter $G_{TX}[k]$ to obtain a frequency domain filtered signal. The frequency domain transmit filter $G_{TX}[k]$ satisfies $|G_{TX}[k]|^2=C_1$ for a frequency index $k=0, 1, \ldots, N-1$, where $C_1$ is a constant, where N is an integer, $|\cdot|$ denotes absolute value, and where N is larger than or equal to a number of the set of modulation symbols. The device may be further configured to transform the frequency domain filtered signal into the time domain. This solution enables a frequency domain implementation for generating the signal, in order to improve transmission performance in time-frequency selective channels. This also enables low-complexity equalization in the frequency domain at a receiver.

According to an implementation form of the first aspect, the device may be further configured to transform the set of modulation symbols into a frequency domain. The device may be further configured to filter the set of transformed modulation symbols based on a multiplication of the set of transformed modulation symbols with a frequency domain transmit filter $G_{TX}[k]$ to obtain a frequency domain filtered signal, wherein the frequency domain transmit filter $G_{TX}[k]$ (404, 1204, 1304) is obtained from the discrete Fourier transform of the basis function $g_{TX}[n]$ for a frequency index $k=0, 1, \ldots, N-1$, where N is an integer, and where N is larger than or equal to a number of the set of modulation symbols. The device may be further configured to transform the frequency domain filtered signal into the time domain. This solution enables a frequency domain implementation for generating the signal based on the discrete Fourier transform of the basis function, in order to improve transmission performance in time-frequency selective channels. This also enables low-complexity equalization in the frequency domain at a receiver.

According to an implementation form of the first aspect, the frequency domain transmit filter $G_{TX}[k]$ satisfies $G_{TX}[k]=\sqrt{C_1}e^{j\phi_k}$ for a sequence of real values $\phi_k$, and where $\phi_k$ is not constant for $k=0, 1, \ldots, N-1$. This solution applies at least substantially orthogonal basis functions to generate the signal, in order to improve transmission performance in time-frequency selective channels.

According to an implementation form of the first aspect, the transform of the set of modulation symbols into the frequency domain may comprise a discrete Fourier transform of size M. The transform of the frequency domain filtered signal into the time domain may comprise an inverse discrete Fourier transform of size N (1306), wherein N>M. This solution reduces complexity of the frequency domain implementation for generating the signal, in order to improve transmission performance in time-frequency selective channels.

According to an implementation form of the first aspect, the device may be further configured to pad the frequency domain filtered signal with N−M zeros. This solution applies the generated signal for multiplexing of data between different transmitters.

According to an implementation form of the first aspect, the device may be further configured to include an indication of at least one parameter of the basis function in at least one control signal or at least one control channel message. This solution enables dynamic adaptation of parameter(s) of the basis function to varying channel conditions in order to increase throughput.

According to an implementation form of the first aspect, the indication of the at least one parameter may be included in physical layer signaling and/or higher layer signaling. This solution enables an indication of the parameter(s) of the basis function to be conveyed to a receiver independent of the basis function.

According to an implementation form of the first aspect, the set of modulation symbols may comprise a constant amplitude sequence, a constant amplitude zero autocorrelation sequence (CAZAC), a modulatable constant amplitude zero autocorrelation (CAZAC) sequence, or a discrete Fourier transform (DFT) sequence, a Hadamard sequence, or a sequence of quadrature amplitude modulation symbols. This solution generates a signal with desired autocorrelation properties, for example to improve synchronization performance at a receiver.

According to an implementation form of the first aspect, the set of modulation symbols may comprise a modulation symbol sequence selected from a set of orthogonal modulation symbol sequences. This solution generates a signal with desired cross-correlation properties, for example, to enable the signal to be used as a synchronization signal or a reference signal at a receiver.

According to an implementation form of the first aspect, the set of orthogonal modulation symbol sequences may comprise a set of Björck sequences, a set of Frank sequences, a set of GCL, a set of DFT sequences, a set of Hadamard sequences, a set of constant amplitude zero autocorrelation (CAZAC) sequences, or a set of modulatable CAZAC sequences. This solution provides sets of sequence suitable for generating signals with desired cross-correlation properties.

According to an implementation form of the first aspect, the set of modulation symbols may comprise data symbols or preconfigured reference symbols or synchronization symbols for at least one receiver. This solution enables provision of application data or reference information to a receiver with the signal, to improve transmission performance of such signals in time-frequency selective channels.

According to an implementation form of the first aspect, the device may be further configured to transmit a continuous time signal based on the signal. This solution enables the signal to be conveyed over an analog transmission medium.

According to a second aspect, a device is provided for receiving a signal. The device may be configured to demodulate the signal, where the signal comprises a plurality of basis functions modulated based on a set of modulation symbols, where the plurality of basis functions comprise cyclically shifted versions of a basis function, and where a periodic autocorrelation function of the basis function comprises an ideal (perfect) periodic autocorrelation function. This solution improves transmission performance in time-frequency selective channels and reduces complexity at a receiver.

According to an implementation form of the second aspect, the basis function may comprise a Björck sequence, a Frank sequence, a GCL, a Zadoff-Chu sequence, a CAZAC sequence, a modulatable CAZAC sequence, or a binary-to-biphase transformation of a maximum length sequence. This solution reduces receiver complexity for example when compared to signals generated based on a chirp signal as the basis function.

According to an implementation form of the second aspect, the plurality of basis functions may exclude a chirp signal configured with a phase being variable based on a bivariate quadratic polynomial including a zeroth degree coefficient which is dependent on a maximum number of the plurality of basis functions. This solution avoids the use of a particular type of chirp signal having a relatively high complexity.

According to an implementation form of the second aspect, the plurality of basis functions may exclude a chirp signal configured with a phase being variable based on a bivariate quadratic polynomial including any zeroth degree coefficient or wherein the zeroth degree coefficient is equal to zero. This solution avoids the use of a particular type of chirp signal having a relatively high complexity.

According to an implementation form of the second aspect, the basis function may comprise a chirp signal configured with a phase being variable based on a bivariate quadratic polynomial $p(m, n)=\alpha m^2+\alpha n^2-2\alpha nm+\beta n-\beta m+\gamma$ of a modulation symbol index m and a basis function time index $n=0, 1, \ldots, N-1$, where $\alpha$, $\beta$ and $\gamma$ are real-valued coefficients, where a zeroth degree coefficient $\gamma$ is independent of the maximum number of the plurality of basis functions, and wherein N is an integer and where N is larger than or equal to a number of the set of modulation symbols.

This solution improves transmission performance in time-frequency selective channels with a chirp signal as the basis function.

According to an implementation form of the second aspect, the signal may comprise a sum of the plurality of modulated basis functions. This solution enables modulated basis functions of the signal to be orthogonally multiplexed.

According to an implementation form of the second aspect, the device may be further configured to reconstruct the set of modulation symbols based on a matched receive filter $g_{RX}[k]=g_{TX}*[-k]$, wherein $g_{TX}[n-m]$ is an mth cyclically shifted basis function, and wherein the basis function $g_{TX}[n]$ satisfies $$\sum_{n=0}^{N-1} g_{TX}[n + t(\mathrm{mod}\ N)]g_{TX}^*[n] = \sum_{n=0}^{N-1} |g_{TX}[n]|^2 \cdot \delta[t],$$

where $\delta[k]$ is a Kronecker delta function $\delta[k]=1$ for $k=0$ and $\delta[k]=0$ for $k\neq 0$, m is a modulation symbol index, and t is an integer, $(\cdot)*$ is a complex conjugate operator, (mod N) is a modulo-N operator, $|\cdot|$ denotes absolute value, and wherein the basis function $g_{TX}[n]$ satisfies $$g_{TX}[n]=g_{TX}[n\pm N],$$

where N is an integer and where N is larger or equal to a number of the set of modulation symbols. This solution improves transmission performance in time-frequency selective channels while providing a time-domain implementation with low complexity for demodulating the signal.

According to an implementation form of the second aspect, the device may be further configured to transform the signal into frequency domain. The device may be further configured to equalize the set of modulation symbols in the frequency domain. The device may be further configured to filter the equalized set of modulation symbols based on a multiplication of the equalized set of modulation symbols with a frequency domain transformation $G_{RX}[k]$ of the matched receive filter $g_{RX}[k]$. The device may be further configured to transform the filtered set of modulation symbols to a time domain. This solution improves transmission performance while also enabling low-complexity equalization of the signal in frequency domain.

According to an implementation form of the second aspect, the device may be further configured to receive an indication of at least one parameter of the basis function in at least one control signal or at least one control channel message. The device may be further configured to demodulate the signal based on the at least one parameter of the basis function. This solution enables the device to demodulate signal with dynamically configured parameter(s) of the basis function, for example to improve transmission performance in varying channel conditions.

According to an implementation form of the second aspect, the indication of the at least one parameter may be included in physical layer signaling and/or higher layer signaling. This solution enables an indication of the parameter(s) of the basis function to be conveyed to the device independent of the basis function.

According to an implementation form of the second aspect, the set of modulation symbols may comprise a constant amplitude sequence, a CAZAC, a modulatable CAZAC sequence, or a DFT sequence, a Hadamard sequence, or a sequence of quadrature amplitude modulation symbols. This solution enables reception of signals with desired autocorrelation properties, for example to improve synchronization performance at the device.

According to an implementation form of the second aspect, the set of modulation symbols may comprise a modulation symbol sequence selected from a set of orthogonal modulation symbol sequences. This solution enables reception of signals with desired cross-correlation properties, for example when the signal is provided as a synchronization signal or a reference signal.

According to an implementation form of the second aspect, the set of orthogonal modulation symbol sequences may comprise a set of Björck sequences, a set of Frank sequences, a set of GCL, a set of DFT sequences, a set of Hadamard sequences, a set of CAZAC sequences, or a set of modulatable CAZAC sequences. This solution provides sets of sequence suitable for generating signals with desired cross-correlation properties.

According to an implementation form of the second aspect, the set of modulation symbols may comprise data symbols or preconfigured reference symbols or synchronization symbols. These solutions enable reception of application data or reference information with improved transmission performance in time-frequency selective channels.

According to an implementation form of the second aspect, the device may be further configured to perform channel estimation or synchronization based on the preconfigured reference symbols or synchronization symbols. This solution enables the device to take advantage of the improved transmission performance, for example in channel estimation or synchronization.

According to an implementation form of the second aspect, the device may be further configured to receive a continuous time signal and sample the continuous time signal to obtain the signal. This solution enables the signal to be received over an analog transmission medium.

According to a third aspect, a method for generating a signal is provided. The method may comprise obtaining a set of modulation symbols and modulating a plurality of basis functions based on the set of modulation symbols to generate the signal. The plurality of basis functions comprise cyclically shifted versions of a basis function, wherein a periodic autocorrelation function of the basis function comprises an ideal (perfect) periodic autocorrelation function. These solutions improve transmission performance in time-frequency selective channels and reduces complexity at a transmitter. Further implementation forms of the method of the third aspect may include implementation forms corresponding to the implementation forms of the first aspect.

According to a fourth aspect, a method for receiving a signal is provided. The method may comprise demodulating the signal, wherein the signal comprises a plurality of basis functions modulated based on a set of modulation symbols. The plurality of basis functions comprise cyclically shifted versions of a basis function, wherein a periodic autocorrelation function of the basis function comprises an ideal (perfect) periodic autocorrelation function. These solutions improve reception performance in time-frequency selective channels and reduces complexity at a receiver. Further implementation forms of the method of the fourth aspect may include implementation forms corresponding to the implementation forms of the second aspect.

According to a fifth aspect, a computer program for generating a signal is provided. The computer program may comprise program code configured to cause performance of the method of the third aspect, or any implementation form thereof, when the computer program is executed on a computer.

According to a sixth aspect, a computer program for receiving a signal is provided. The computer program may comprise program code configured to cause performance of the method of the fourth aspect, or any implementation form thereof, when the computer program is executed on a computer.

According to a seventh aspect, a device for generating a signal is provided. The device may be configured to obtain a set of input symbols. The device may be further configured to modulate a plurality of chirp signals, w[m,n], of the signal based on the set of input symbols. The plurality of chirp signals, w[m,n], are based on a bivariate quadratic polynomial p(m,n) of input symbol index m and chirp signal time index n, wherein the bivariate quadratic polynomial p(m,n) comprises at least one second degree coefficient and at least one first degree coefficient configured to cause the plurality of chirp signals to be substantially orthogonal and to be periodic. These solutions improve transmission performance in time-frequency selective channels.

According to an implementation form of the seventh aspect the at least one second degree coefficient may be determined from a set of second coefficient values comprising at least two values for the at least one second degree coefficient or the at least one first degree coefficient may be determined from a set of first coefficient values comprising at least two values for the at least one first degree coefficient. This solution enables the generated signal to be configured based on predetermined sets of coefficients.

According to an implementation form of the seventh aspect, the polynomial p(m,n) may further comprise at least one zeroth degree coefficient. This solution enables the plurality of chirp signals to be phase shifted and thereby incorporates advanced techniques such as constellation rotation to further improve performance.

According to an implementation form of the seventh aspect, the zeroth degree coefficient may be constant with respect to N, wherein N is a maximum number of the plurality of chirp signals, w[m,n], and wherein N is a positive integer. This solution enables the plurality of chirp signals to have phase shifts that are independent of the maximum number of chirp signals and thereby incorporates advanced techniques such as constellation rotation to further improve performance.

According to an implementation form of the seventh aspect, the at least one second degree coefficient may comprise $\alpha$, the at least one first degree coefficient may comprise $\beta$, the at least one zeroth degree coefficient may comprise $\gamma$, and the plurality of chirp signals, w[m,n], may be based on $$w[m, n] = \frac{1}{\sqrt{N}} e^{-j\frac{2\pi}{N} p(m,n)},$$

where $p(m, n) = \alpha m^2 + \alpha n^2 - 2\alpha nm + \beta n - \beta m + \gamma$. This solution provides an example of a suitable formulation for the plurality of chirp signals to improve transmission performance in time-frequency selective channels and to provide suitable time-frequency ambiguity functions when used as a reference/synchronization signal.

According to an implementation form of the seventh aspect, the signal may be based on a time-discrete signal $$s[n] = \sum_{m=0}^{N-1} x[m] \frac{1}{\sqrt{N}} e^{-j\frac{2\pi}{N}(\alpha m^2 + \alpha n^2 - 2\alpha nm + \beta n - \beta m + \gamma)}.$$

This solution provides an example of a suitable formulation for a signal comprising a plurality of chirp signals to improve transmission performance in time-frequency selective channels and to provide suitable time-frequency ambiguity functions when used as a reference/synchronization signal.

According to an implementation form of the seventh aspect, a, J, and 7 may be real-valued coefficients which fulfill:

$$\left|\left\lfloor\frac{2\alpha d}{N}\right\rfloor - \frac{2\alpha d}{N}\right| > 0,$$

for d=1, 2, ..., N−1, and

αN+β=q, where q is an integer.

This solution provides an example of conditions for ensuring that the plurality of chirp signals are sufficiently orthogonal and are periodic.

According to an implementation form of the seventh aspect, the set of input symbols may comprise one of a set of antipodal input symbols, a set of M-ary phase shift keying (M-PSK) input symbols, a set of identical input symbols, or a set of complex-valued input symbols having a constant magnitude. This solution generates signals with desired time-frequency ambiguity functions to enable improved time and/or frequency synchronization at a receiver.

According to an implementation form of the seventh aspect, the set of input symbols is based on a binary sequence, a pseudorandom binary sequence, or a maximum length sequence (m-sequence). This solution provides a low-complexity implementation for obtaining the set of input symbols to enable improved time and/or frequency synchronization at a receiver.

According to an implementation form of the seventh aspect, the device may be further configured to generate the signal in time domain based on a transmit filter, wherein the transmit filter is based on a univariate quadratic function p(k) of a time domain sample index k, and wherein the univariate quadratic function comprises the at least one second degree coefficient, the at least one first degree coefficient, and the at least one zeroth degree coefficient. This solution enables a simple time-domain implementation for generating the signal to improve transmission performance in time-frequency selective channels and to provide suitable time-frequency ambiguity functions when used as a reference/synchronization signal.

According to an implementation form of the seventh aspect, the device may be further configured to generate the signal based on a time-discrete signal $$s[n] = \sum_{m=0}^{N-1} x[m] g_{TX}[n-m].$$

This solution provides an example of a suitable formulation for generating the signal in time domain based on a transmit filter.

According to an implementation form of the seventh aspect, the device may be further configured to transform the set of input symbols into the frequency domain, transform a transmit filter into the frequency domain. The transmit filter is based on a univariate quadratic function p(k) of a frequency domain sample index k, and wherein the univariate quadratic function comprises the at least one second degree coefficient, the at least one first degree coefficient, and the at least one zeroth degree coefficient. The device may be further configured to apply the transformed transmit filter to the transformed set of input symbols to obtain a frequency domain filtered signal. The device may be further configured to transform the frequency domain filtered signal into time domain. This solution enables a simple frequency domain implementation for generating the signal.

According to an implementation form of the seventh aspect, the device may be further configured to transform the set of input symbols into frequency domain. The device may be further configured to apply a transmit filter to the transformed set of input symbols to obtain a frequency domain filtered signal. The transmit filter is based on a univariate quadratic function p(k) of a frequency domain sample index k, and wherein the univariate quadratic function comprises the at least one second degree coefficient, the at least one first degree coefficient, and the at least one zeroth degree coefficient. The device may be further configured to transform the frequency domain filtered signal into time domain. This solution enables a simple frequency domain implementation for generating the signal.

According to an implementation form of the seventh aspect, the transmit filter comprises $$g_{TX}[k] = \frac{1}{\sqrt{N}} e^{-j\frac{2\pi}{N}(\alpha k^2 + \beta k + \gamma)}.$$

This solution provides an example of a suitable formulation for the transmit filter to generate the signal in time or frequency domain.

According to an implementation form of the seventh aspect, the device may be further configured to determine the at least one second degree coefficient or the at least one first degree coefficient based on a performance condition. This solution dynamically adapts the polynomial coefficients to varying channel conditions to increase throughput.

According to an implementation form of the seventh aspect, the performance condition may comprise a maximum of a minimum ratio of symbol power and inter-symbol interference power, or a maximum of an average ratio of the symbol power and the inter-symbol interference power. This solution enables the polynomial coefficients to be dynamically adapted based on inter-symbol interference power to increase throughput.

According to an implementation form of the seventh aspect, the device may be further configured to include an indication of the at least one second degree coefficient or the at least one first degree coefficient in at least one control signal or at least one control channel message. This solution enables a receiver to adapt to the dynamically determined polynomial coefficients.

According to an implementation form of the seventh aspect, the set of input symbols may comprise a modulation symbol sequence selected from a set of orthogonal modulation symbol sequences. This solution generates a set of orthogonal signals regardless of the selection of the polynomial coefficients.

According to an implementation form of the seventh aspect, the device may be further configured to generate a set of substantially orthogonal signals based on a subset of values for the at least one second degree coefficient and a subset of values for the at least one first degree coefficient. The set of substantially orthogonal signals is based on different combinations of values of the at least one second degree coefficient and the at least one first degree coefficient. This solution generates a set of substantially orthogonal signals regardless of the input symbols.

According to an implementation form of the seventh aspect, the device may be further configured to assign subsets of the set of input symbols to a plurality of users or a plurality of information streams. This solution enables the signal to carry data from multiple users or information streams.

According to an implementation form of the seventh aspect, the device may be further configured to transmit the signal. This solution enables the generated signal to be conveyed to a receiver.

According to an eighth aspect, a device for receiving a signal is provided. The device may be configured to demodulate the signal. The signal comprises a plurality of chirp signals, $w[m,n]$, modulated based on a set of input samples, wherein the plurality of chirp signals, $w[m,n]$, are based on a bivariate quadratic polynomial $p(m,n)$ of input symbol index m and chirp signal time index n, wherein the bivariate quadratic polynomial $p(m,n)$ comprises at least one second degree coefficient and at least one first degree coefficient configured to cause the plurality of chirp signals to be substantially orthogonal and to be periodic. These solutions improve reception performance in a transmission system.

According to an implementation form of the eighth aspect, the polynomial $p(m,n)$ may further comprise at least one zeroth degree coefficient. This solution enables the plurality of chirp signals to be phase shifted and thereby incorporates advanced techniques such as constellation rotation to further improve performance.

According to an implementation form of the eighth aspect, the zeroth degree coefficient may be constant with respect to N, wherein N is a maximum number of the plurality of chirp signals, $w[m,n]$, and wherein N is a positive integer. This solution enables the plurality of chirp signals to have phase shifts that are independent of the maximum number of chirp signals and thereby incorporates advanced techniques such as constellation rotation to further improve performance.

According to an implementation form of the eighth aspect, the at least one second degree coefficient may comprise $\alpha$, the at least one first degree coefficient may comprise $\beta$, the at least one zeroth degree coefficient may comprise $\gamma$, and the plurality of chirp signals, $w[m,n]$, may be based on $$w[m, n] = \frac{1}{\sqrt{N}} e^{-j\frac{2\pi}{N} p(m,n)},$$

where $p(m, n)=\alpha m^2+\alpha n^2-2\alpha nm+\beta n-\beta m+\gamma$. This solution provides an example of suitable chirp signals to improve reception performance in time-frequency selective channels.

According to an implementation form of the eighth aspect, the signal may be based on a time-discrete signal $$s[n] = \sum_{m=0}^{N-1} x[m] \frac{1}{\sqrt{N}} e^{-j\frac{2\pi}{N}(\alpha m^2+\alpha n^2-2\alpha nm+\beta n-\beta m+\gamma)}.$$

This solution provides an example of a suitable formulation for a signal comprising a plurality of chirp signals to improve reception performance in time-frequency selective channels.

According to an implementation form of the eighth aspect, $\alpha$, $\beta$, and $\gamma$ may be real-valued coefficients which fulfill:

i.

$$\left| \left[ \frac{2\alpha d}{N} \right] - \frac{2\alpha d}{N} \right| > 0,$$

for d=1, 2, . . . , N−1, and
ii. $\alpha N+\beta=q$, where q is an integer.

This solution provides an example of conditions for sufficiently orthogonal and periodic chirp signals.

According to an implementation form of the eighth aspect, the set of input symbols may comprise one of: a set of antipodal input symbols, a set of M-PSK input symbols, a set of identical input symbols, or a set of complex-valued input symbols having a constant magnitude. This solution receives signals with desired time-frequency ambiguity functions and thereby to improve time and/or frequency synchronization.

According to an implementation form of the eighth aspect, the set of input symbols may be based on a binary sequence, a pseudorandom binary sequence, or a maximum length sequence (m-sequence). This solution provides a low-complexity implementation for determining a set of predetermined candidate signals to enable improved time and/or frequency synchronization.

According to an implementation form of the eighth aspect, the device may be further configured to perform time synchronization and/or frequency synchronization based on a correlation of the received signal with at least one predetermined signal. This solution improves time-frequency synchronization based on the advantageous time-frequency ambiguity function of the signal.

According to an implementation form of the eighth aspect, the device may be further configured to detect the at least one second degree coefficient, or the at least one first degree coefficient based on a correlation of the received signal with a set of predetermined signals corresponding to sets of candidate values for the at least one second degree coefficient or the at least one first degree coefficient. This solution enables a receiver to determine the polynomial coefficients without explicit signaling and to adapt to dynamically changing coefficients in order to increase throughput under varying channel conditions.

According to an implementation form of the eighth aspect, the device may be further configured to receive an indication of the at least one second degree coefficient or the at least one first degree coefficient in at least one control signal or at least one control channel message. This solution enables a receiver to be informed about used polynomial coefficients and to adapt to dynamically changing coefficients in order to increase throughput under varying channel conditions.

According to an implementation form of the eighth aspect, the device may be further configured to demodulate the received signal in time domain based on a matched filter corresponding to the transmit filter. This solution enables time domain demodulation of the received signal to improve reception performance in time-frequency selective channels.

According to an implementation form of the eighth aspect, the device may be further configured to transform the received signal into frequency domain. The device may be further configured to equalize the received signal in the frequency domain. The device may be further configured to apply a frequency domain matched filter to filter the received signal in the frequency domain. The device may be further configured to transform the filtered signal into time domain. This solution enables a discrete Fourier transform spread orthogonal frequency division multiplexing (DFT-s-OFDM) like demodulation of the received signal to improve reception performance in time-frequency selective channels.

According to a ninth aspect, a method for generating a signal is provided. The method may comprise obtaining a set of input symbols. The method may further comprise modulating a plurality of chirp signals, w[m,n], of the signal based on the set of input symbols. The plurality of chirp signals, w[m,n], are based on a bivariate quadratic polynomial p(m,n) of input symbol index m and chirp signal time index n, wherein the bivariate quadratic polynomial p(m,n) comprises at least one second degree coefficient and at least one first degree coefficient configured to cause the plurality of chirp signals to be substantially orthogonal and periodic. These solutions improve transmission performance in time-frequency selective channels.

According to a tenth aspect, a method for receiving a signal is disclosed. The method may comprise demodulating the signal, wherein the signal comprises a plurality chirp signals, w[m,n], modulated based on a set of input symbols, wherein the plurality of chirp signals, w[m,n], are based on a bivariate quadratic polynomial p(m,n) of input symbol index m and chirp signal time index n, wherein the bivariate quadratic polynomial p(m,n) comprises at least one second degree coefficient and at least one first degree coefficient configured to cause the plurality of chirp signals to be substantially orthogonal and periodic. These solutions improve reception performance in time-frequency selective channels.

According to an eleventh aspect, a computer program is provided. The computer program may comprise program code configured to cause performance of any implementation form of the method of the third aspect, when the computer program is executed on a computer.

According to a twelfth aspect, a computer program is provided. The computer program may comprise program code configured to cause performance of any implementation form of the method of the fourth aspect, when the computer program is executed on a computer.

Implementation forms of the present disclosure can thus provide devices, methods, and computer programs, for generating or receiving a signal comprising cyclically shifted basis functions. Any implementation form may be combined with one or more other implementation forms of one or more of the above aspects. These and other aspects of the present disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Figure 1:
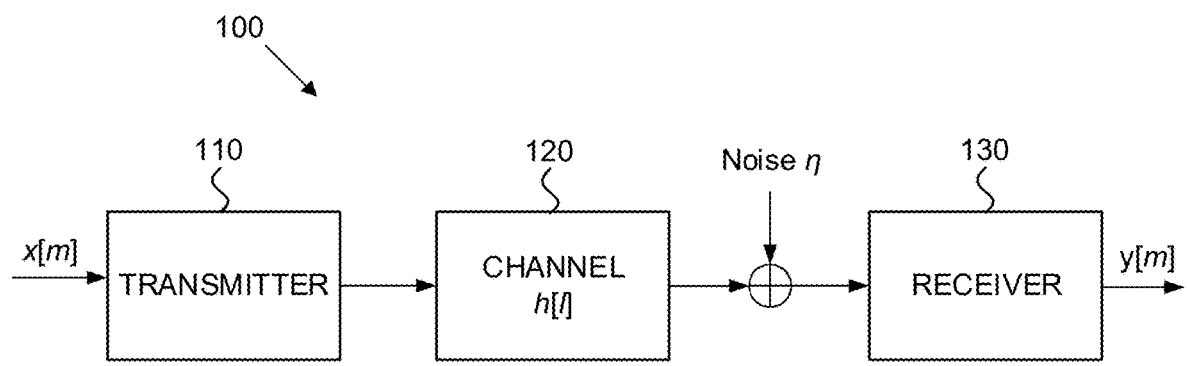
FIG. 1 illustrates an example of a communication system model.

Reference will now be made in detail to example embodiments, examples of which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of operations for constructing and operating the examples. However, the same or equivalent functions and sequences may be accomplished by different examples.

Orthogonal frequency division multiplexing (OFDM) provides an efficient transmission method over fading radio channels. However, performance in time and/or frequency selective channels may be improved, for example, by orthogonal chirp division multiplexing (OCDM), where the Fourier basis functions of OFDM may be replaced by chirp comprising complex exponential functions with a second-degree polynomial. The frequency of a chirp is time-variant and therefore the modulation symbols may spread both in time and frequency domain. However, by proper design of the chirp, orthogonal signaling can be maintained.

OCDM signals assume fixed polynomial coefficients, which are suitable for time-invariant channels, while coefficients of other chirp waveforms for OFDM may be adjusted or adapted to a particular channel realization in order to maximize performance. Furthermore, albeit several chirp based waveforms could be expressed by certain transforms, the chirp basis function could be also decomposed into two chirps and one discrete Fourier transform (DFT) basis function. Therefore, a transmitter of the chirp signals, and similarly a corresponding receiver, could be seen as an OFDM system where chirp modulation is applied in the frequency domain prior to the inverse DFT (IDFT), as well as in the time domain after the IDFT. However, embodiments of the present disclosure also enable an adjustable chirp waveform to be implemented as filtered DFT-spread-OFDM (DFT-s-OFDM). Furthermore, the example embodiments of the present disclosure provide chirp waveforms suitable for use as reference signals, for example as synchronization signals, or as radar signals.

An objective of the present example embodiments is therefore to construct a generalized orthogonal chirp waveform, in particular for applications on time-frequency selective channels, which provides a broad choice of selection of the polynomial coefficients while allowing simple transmitter and receiver implementation. A further objective is to develop the chirp waveform also to be applicable as a synchronization signal or a radar signal. The disclosed generalized orthogonal chirp waveform overcomes limitations on polynomial coefficient selection, while allowing implementation based on filtered DFT-s-OFDM structures. This is advantageous since introducing the filter to a DFT-s-OFDM structure is not significantly increasing the implementation complexity. Moreover, existing methods, e.g., channel estimation, receiver algorithms etc. which exist for DFT-s-OFDM can be reused with minor enhancements for incorporating the filter.

According to an embodiment, a signal may be generated by modulating a plurality of chirp signals with a set of input symbols. The plurality of chirp signals may be based on a bivariate quadratic polynomial with configurable second, first, and zeroth degree polynomial coefficients. Equivalently, the signal may be generated based on a transmit filter comprising a chirp signal which is based on a univariate quadratic polynomial comprising the same second, first, and zeroth degree coefficients. The disclosed signal improves performance in time-frequency selective channels. Furthermore, the disclosed signal format may be used for many purposes such as for example data transmission, reference signal transmission, or as a basis for obtaining a set of orthogonal signals, either by selection of the polynomial coefficients or the set of input symbols.

FIG. 1 illustrates an example of a communication system model 100, according to an embodiment. The communication system model 100 may comprise a transmitter 110, a channel model 120, and a receiver 130. The transmitter 110 generates a signal based on a set of input symbols x[m]. The transmitted signal is fed through the channel model 120 having an impulse response h[l]. Additive white Gaussian noise η may be added after the channel model 120, before providing the signal to the receiver 130.

As a motivation for OFDM, in a linear time-invariant fading channel, the received time-discrete signal is given for n=0, 1, ..., N−1 by $$y[n] = \sum_{l=0}^{N-1} h[l]x[n-l] + \eta.$$

This can be equivalently expressed on matrix form with a convolution matrix H as y=Hx+η, and it can be shown that H is a circulant matrix if the symbols include a cyclic prefix. Such a matrix can be decomposed as H=F†ΛF, where Λ is a diagonal matrix with elements $$\Lambda_k = \sum_{l=0}^{N-1} h[l] e^{-j\frac{2\pi}{N}kl}$$

for k=0, 1, ..., N−1, † denotes the Hermitian operator, F is a DFT matrix with the Fourier basis functions, and j is the imaginary unit j=√−1. OFDM transmission comprises generating x=F†s where s is the vector of the input symbols (data modulation symbols). The receiver may perform demodulation according to ŷ=Fy=FF†ΛFF†s+Fη=Λs+Fη. Therefore, the basis functions of OFDM transmit on the eigenmodes of the channel. However, if the channel is time-variant, or in other words, the channel impulse response is given by h[n,l], the above matrix decomposition of H is not possible, orthogonality is lost, and other base functions, e.g., chirps, may be used instead.

For OCDM a set of orthogonal chirps are defined such that it results in the basis functions $$w[m,n] = \frac{e^{j\frac{\pi}{4}}}{\sqrt{N}} e^{-j\frac{\pi}{N}\left(n-m+\frac{1}{2}\cdot(N)_2\right)^2},$$

where $(\cdot)_p$ is a modulo-P operator. Thus, OCDM does not include any adjustable polynomial coefficients. Under certain assumptions on channel state information (CSI) availability, the information-theoretic coded modulation capacity of OCDM may be higher (almost 20%) compared to OFDM in a frequency selective channel and higher compared to DFT-s-OFDM in a time selective channel. Performance gains of OCDM over OFDM in time-invariant channels may be achieved for example by using a decision-feedback equalizer (DFE) or other advanced iterative receivers. OCDM may be used also to improve robustness to the channel delay spread exceeding the length of the cyclic prefix. However, a drawback of OCDM is that it assumes fixed polynomial coefficients, as discussed above.

An example of a chirp waveform with an adjustable parameter is the discrete chirp Fourier transform (DCFT) for which the basis functions are given by $$w[m, n] = \frac{1}{\sqrt{N}} e^{-j\frac{2\pi}{N}(ln^2 + mn)}$$

where the chirp rate l can be any positive integer.

It can be shown that an OFDM waveform modulated with a chirp whose coefficients are channel dependent, provides an optimal transmission scheme in a channel with linear delay-Doppler spread. Similarly, chirp waveforms for time-varying channels resulting in significant gains can be derived based on matching the chirp coefficients to the delay-Doppler characteristics of the channel. These two examples are based on assuming continuous-time and the corresponding discrete waveforms can be shown to be only approximately orthogonal. Another example of orthogonal discrete-time chirps with adaptable parameters may be expressed by basis functions of the form $$w[m, n] = \frac{1}{\sqrt{N}} e^{j2\pi(c_1 n^2 + c_2 m^2 + \frac{nm}{N})}.$$

By proper selection of the chirp coefficients $c_1$ and $c_2$, signal-to-interference ratio gains of several dB may be achieved for a two-path channel model, and for a large range of mobile terminal velocities. However, performance and adaptability of orthogonal chirp waveforms for different applications may be further enhanced. A drawback of this waveform is that, in contrast to OCDM and the disclosed waveform, it cannot be implemented as filtered DFT-s-OFDM.

Figure 2:
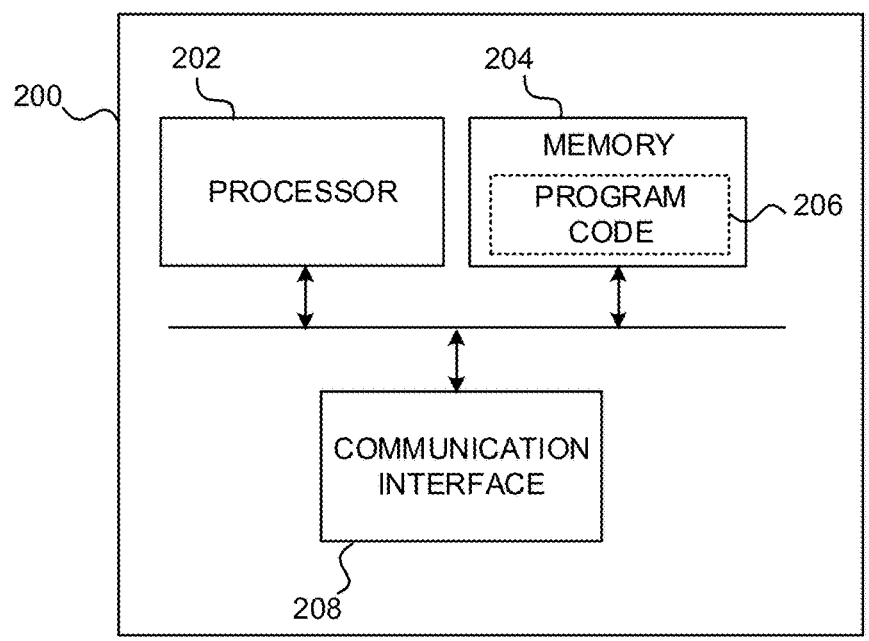
FIG. 2 illustrates an example of a device configured to practice one or more embodiments of the disclosure.

FIG. 2 illustrates an example of a device configured to practice one or more embodiments. Device 200 may be, for example, configured to generate an orthogonal chirp signal or receive an orthogonal chirp signal. Device 200 may comprise at least one processor 202. The at least one processor 202 may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device 200 may further comprise at least one memory 204. The memory 204 may be configured to store, for example, computer program code or the like, for example operating system software and application software. The memory 204 may comprise one or more volatile memory devices, one or more non-volatile memory devices, and/or a combination thereof. For example, the memory may be embodied as magnetic storage devices (such as hard disk drives, magnetic tapes, etc.), optical magnetic storage devices, or semiconductor memories (such as mask read-only memory (ROM), PROM (programmable ROM), EPROM (erasable PROM), flash ROM, RAM (random access memory), etc.).

Device 200 may further comprise communication interface 208 configured to enable the device 200 to transmit and/or receive information. The communication interface 208 may comprise an internal communication interface such as for example an interface between baseband circuitry and radio frequency (RF) circuitry of a transmitter, receiver, or a transceiver device. Alternatively, or additionally, the communication interface 208 may be configured to provide at least one external wireless radio connection, such as for example a $3^{rd}$ generation partnership project (3GPP) mobile broadband connection (e.g., third generation (3G), fourth generation (4G), fifth generation (5G)); a wireless local area network (WLAN) connection such as for example standardized by the Institute of Electrical and Electronics Engineers (IEEE) 802.11 series or wireless fidelity (Wi-Fi) alliance; a short range wireless network connection such as for example a Bluetooth connection. The communication interface 208 may hence comprise one or more antennas to enable transmission and/or reception of radio frequency signals over the air. The device 200 may further comprise other components and/or functions such as for example a user interface (not shown) comprising at least one input device and/or at least one output device. The input device may take various forms such a keyboard, a touch screen, or one or more embedded control buttons. The output device may for example comprise a display, a speaker, a vibration motor, or the like.

When the device 200 is configured to implement some functionality, some component and/or components of the device, such as for example the at least one processor 202 and/or the at least one memory 204, may be configured to implement this functionality. Furthermore, when the at least one processor 202 is configured to implement some functionality, this functionality may be implemented using program code 206 comprised, for example, in the memory 204.

The functionality described herein may be performed, at least in part, by one or more computer program product components such as software components. According to an embodiment, the device 200 comprises a processor or processor circuitry, such as for example a microcontroller, configured by the program code 206 when executed to execute the embodiments of the operations and functionality described herein. Alternatively, or in addition, the functionality described herein can be performed, at least in part, by one or more hardware logic components. For example, and without limitation, illustrative types of hardware logic components that can be used include FPGAs, ASICs, application-specific standard products (ASSPs), system-on-a-chip systems (SOCs), complex programmable logic devices (CPLDs), graphics processing units (GPUs), or the like.

The device 200 may be configured to perform method(s) described herein or comprise means for performing method (s) described herein. In one example, the means comprises the at least one processor 202, the at least one memory 204 including program code 206 configured to, when executed by the at least one processor 202, cause the device 200 to perform the method(s).

The device 200 may comprise, for example, a computing device such as for example a modulator chip, a demodulator chip, a baseband chip, a mobile phone, a tablet, a laptop, an internet-of-things (IoTs) device, or the like. Although the device 200 is illustrated as a single device, it is appreciated that, wherever applicable, functions of the device 200 may be distributed to a plurality of devices, for example between components of a transmitter, a receiver, or a transceiver.

According to an embodiment, a discrete-time waveform of a signal may be expressed as $$s[n] = \sum_{m=0}^{N-1} x[m]w[m, n] \quad (1)$$

for n=0, 1, ..., N−1, where x[m] is taken from a set of (real or complex-valued) input symbols. The plurality of chirp signals w[m, n] may comprise a term $$e^{-j\frac{2\pi}{N}p(m,n)},$$

where p(m,n) may comprise a quadratic polynomial and where $j=\sqrt{-1}$. The time-discrete signal (1) may be obtained by sampling the corresponding time-continuous signal $s(t)=\sum_{m=0}^{N-1} x[m]w(m,t)$ defined for $0 \le t \le T$ at $t=nT/N$ for n=0, 1, ..., N−1.

In general, a quadratic polynomial may be expressed as $f(x, y, z)=a_1x^2+a_2y^2+a_3z^2+a_4xy+a_5xz+a_6yz+a_7x+a_8y+a_9z+a_{10}$, where $a_1$ to $a_{10}$ are the coefficients of the different terms of the polynomial. A degree of a term may be defined as the sum of exponents of the term. Hence, the polynomial f(x,y,z) comprises six second degree coefficients $a_1$ to $a_6$, three first degree coefficients $a_7$ to $a_9$, and one zeroth degree coefficient $a_{10}$ (a scalar term). A bivariate quadratic polynomial $f(x,y)=a_1x^2+a_2y^2+a_3xy+a_4x+a_5y+a_6$ comprises three second degree coefficients $a_1$ to $a_3$, two first degree coefficients $a_4$ and $a_5$, and one zeroth degree coefficient $a_6$. A univariate quadratic polynomial $f(x)=a_1x^2+a_2xy+a_3$ may comprise one second degree coefficient $a_1$, one first degree coefficient $a_2$, and one zeroth degree coefficient $a_3$.

According to an embodiment, a device may obtain a set of input symbols. The set of input symbols may comprise application data received for transmission. The obtained set of input symbols may further comprise data generated by the device such as for example padding data, for example zero padding. The device may modulate a plurality of chirp signals, w[m, n], based on the set of input symbols. The plurality of chirp signals, w[m, n], may be based on a polynomial p(m,n), which may comprise a bivariate quadratic polynomial of input symbol index m and chirp signal time index n. The bivariate quadratic polynomial may comprise at least one second degree coefficient and at least one first degree coefficient. The second and first degree coefficients may be configured to cause the plurality of chirp signals, w[m, n], to be substantially orthogonal and to be periodic. The polynomial p(m,n) may further comprise at least one zeroth degree coefficient. The zeroth degree coefficient may be configured to cause desired phase shifts in the signal. If no approximation is applied, the plurality of chirp signals may be orthogonal.

The plurality of chirp signals may be based on term $$e^{-j\frac{2\pi}{N}p(m,n)}.$$

N may be a positive integer. The at least one zeroth degree coefficient may be independent of N. Hence, the at least one zeroth degree coefficient may be constant with respect to N. N may indicate a maximum number of the chirp signals. The maximum number of chirp signals may refer to a number of chirp signals for which the plurality of chirp signals can be still made substantially orthogonal. It is however noted that all possible chirp signals may not be modulated in some embodiments, for example to provide guard bands, to enable multi-user multiplexing, or the like. The generated signal may be considered as a multicarrier signal comprising a plurality of chirp signals.

According to an embodiment, the at least one second degree coefficient may be determined from a set of second degree coefficient values. The set of second degree coefficient values may comprise at least two values for the at least one second degree coefficient. The at least one first degree coefficient may be determined from a set of first degree coefficient value. The set of first degree coefficient values may comprise at least two values for the at least one first degree coefficient. The at least one zeroth degree coefficient may be determined from a set of zeroth degree coefficient values. The set of zeroth degree coefficient values may comprise at least two values for the at least one zeroth degree coefficient. It is however appreciated that while a coefficient is determined from a set of coefficients for a particular degree(s), the coefficients for the other degree(s) may be predetermined. Selection of the second, first, or zeroth degree coefficients enables, for example, to dynamically adapt signal characteristics to current transmission conditions or to generate a set of orthogonal signals, as will be further discussed below. It should be noted that contemporary wireless systems rely on adaptive modulation and coding while using a fixed waveform (e.g., OFDM). The disclosed chirp waveform can further be used together with adaptive modulation and coding, in addition to the adaptation of the chirp coefficients.

According to an embodiment, the at least one second degree coefficient may comprise α, the at least one first degree coefficient may comprise β, and the at least one zeroth degree coefficient may comprise γ. The polynomial p(m, n) may comprise $p(m, n)=\alpha m^2+\alpha n^2-2\alpha nm+\beta n-\beta m+\gamma$. Hence, the polynomial p(m, n) may comprise a second degree coefficient α, a first degree coefficient β, and a zeroth degree coefficient γ. The second degree coefficient α may be applied to quadratic terms ($m^2$ and $n^2$) of polynomial p(m, n). The second degree coefficient α may be further applied to a second degree cross-term (nm) of the polynomial p(m, n). Alternatively, the polynomial p(m, n) may be considered to include two second degree coefficients α and 2α, wherein the coefficient for the second-degree cross term comprises a multiple of the coefficient of the quadratic terms, for example the coefficient of the quadratic terms multiplied by two. According to an embodiment, the second degree coefficient α, the first degree coefficient β, and the zeroth degree coefficient γ may be non-zero. The plurality of chirp signals, w[m, n], may comprise or be based on $$w[m, n] = \frac{1}{\sqrt{N}} e^{-j\frac{2\pi}{N}p(m,n)}$$

and therefore $$w[m, n] = \frac{1}{\sqrt{N}} e^{-j\frac{2\pi}{N}(\alpha m^2+\alpha n^2-2\alpha nm+\beta n-\beta m+\gamma)} \quad (2)$$

Coefficients α, β and γ may be real-valued coefficients which fulfil:

$$\left|\left[\frac{2\alpha d}{N}\right] - \frac{2\alpha d}{N}\right| > 0, \text{ for } d = 1, 2, \ldots, N-1, \text{ and} \quad (3)$$

$\alpha N + \beta = q$, where $q$ is an integer. (4)

This ensures that the plurality of chirp signals or basis functions w[m, n] are substantially orthogonal with respect to each other and that each chirp signal is periodic. If no approximation is applied in practical implementation, the plurality of chirp signals may be strictly orthogonal. It is noted that any other suitable normalization factor may be used instead or in addition to $$\frac{1}{\sqrt{N}}.$$

Figure 3:
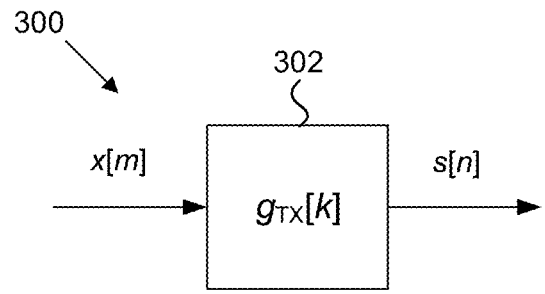
FIG. 3 illustrates an example of a transmission system comprising a time domain transmit filter, according to an embodiment of the disclosure.

FIG. 3 illustrates an example of a transmission system 300 comprising a time domain transmit filter 302, according to an embodiment. The time domain transmit filter may comprise a chirp based time domain transmit filter. Using (1) and (2), an alternative representation of the signal may be provided by $$s[n] = \sum_{m=0}^{N-1} x[m] g_{TX}[n - m] \quad (5)$$

which defines a time-discrete signal s[n] based on input symbols x[m]. The transmit filter 302 may comprise or be based on $$g_{TX}[k] = \frac{1}{\sqrt{N}} e^{-j\frac{2\pi}{N}(\alpha k^2 + \beta k + \gamma)} \quad (6)$$

for k=−N−1, −N, ..., 0, 1, ..., N−1. Therefore, the signal may be alternatively generated in time domain based on the transmit filter 302 that is based on a univariate quadratic function p(k) of a time domain sample index k. The univariate quadratic function p(k) may comprise the at least one second degree coefficient, the at least one first degree coefficient, and the at least one zeroth degree coefficient. Hence, same values of coefficients α, β and γ may be used when generating the signal based on the chirp signal expression (2) or the time domain transmit filter (6). The signal may be generated based on the time-discrete signal s[n] of (5). The univariate quadratic polynomial may comprise p(k) =αk²+βk+γ.

Conditions (3) and (4) may be applied also when the signal is generated using the time domain transmit filter approach to ensure that the plurality of chirp signals or basis functions w[m, n] are substantially orthogonal with respect to each other and that each chirp signal is periodic.

Orthogonality implies that for m≠p, the following should hold:

$$\left|\sum_{n=0}^{N-1} g_{TX}[n-m] g_{TX}^*[n-p]\right| = \left|\frac{1}{N}\sum_{n=0}^{N-1} e^{-j\frac{2\pi}{N}2\alpha n(p-m)}\right| = 0 \quad (7)$$

Since $$\sum_{n=0}^{N-1} e^{j\frac{2\pi}{N}nk} = N\delta[k + rN] \quad (8)$$

for any integer k where r=0, ±1, ±2, ... and δ[k]=1 for k=0 and δ[k]=0, otherwise, the condition (7) is that 2α(p−m) is an integer which is not divisible by N for every (p−m)=1, 2, ..., N−1, which is the same as (3). Periodicity implies that $g_{TX}[k+N]=g_{TX}[k]$, thus by using (6), it is obtained that $$g_{TX}[k + N] = g_{TX}[k] e^{-j\frac{2\pi}{N}(\alpha N^2 + 2\alpha Nk + \beta N)}. \quad (9)$$

From (3), it follows that 2αk is an integer. Hence, the exponential term is equal to unity, when (4) holds. Due to (4), a cyclic prefix extension of length $N_{CP}$ could be defined for (1), if needed, by extending the basis functions to n=−$N_{CP}$, −$N_{CP}$+1, ..., −1. Examples of valid α and β are contained in FIG. 11 for N=139 and in FIG. 12 for N=140. A skilled reader will understand that the complex-conjugate of the basis functions w*[m, n] may be equivalently considered in the analysis and still the same properties may be obtained. Therefore, for example the expression 'based on term $$e^{-j\frac{2\pi}{N}p(m,n)},$$

should be understood to cover also signals that include chirp functions comprising term $$e^{j\frac{2\pi}{N}p(m,n)}.$$

Figure 4:
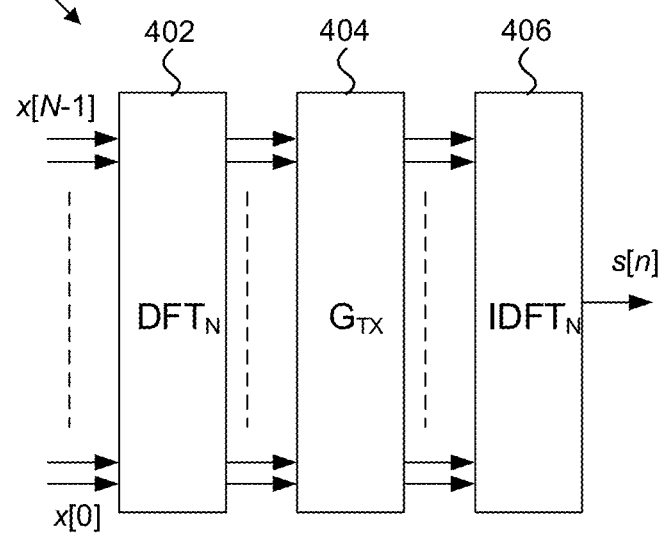
FIG. 4 illustrates an example of a transmission system comprising a frequency domain transmit filter, according to an embodiment of the disclosure.

FIG. 4 illustrates an example of a transmission system 400 comprising a frequency domain transmit filter $G_{TX}$ 404, according to an embodiment. The frequency domain transmit filter 404 may comprise a transformed chirp based frequency domain transmit filter. It can be observed that (5) constitutes a linear convolution of the set of input symbols and the transmit filter. Thus, a transmitter may generate the waveform without any DFT/IDFT operation, for example by performing time domain filtering of the input symbols and extracting samples n=0, 1, ..., N−1. Moreover, from the periodicity of (6), $g_{TX}[(n-m)_N]$ $g_{TX}[n-n]$, and therefore, $$\sum_{m=0}^{N-1} x[m] g_{TX}[(n-m)_N] = \sum_{m=0}^{N-1} x[m] g_{TX}[n-m] = s[n] \quad (10)$$

which is the circular convolution between x[m] and $g_{TX}[k]$. Hence, by defining the vectors x=(x[0], x[1], ..., x[N−1] and $g_{TX}$=($g_{TX}[0]$, $g_{TX}[1]$, ... $g_{TX}[N-1]$), s[n] may be equivalently generated by $$s[n]=IDFT_N[DFT_N[x][k]\cdot DFT_N[g_{TX}][k]][n] \quad (11)$$

where $IDFT_N[y][n]$ and $DFT_N[y][n]$ are the N-point IDFT and DFT in sample n of the vector y, respectively. Based on (11), the chirp waveform (1) may be seen as DFT-s-OFDM chain for input symbols x[0], x[1], ...

, x[N−1], where the transmission system 400 comprises an N-point DFT-precoder 402, a frequency domain transmit filter $G_{TX}$ 404, and an N-point IDFT 406. Hence, data may be filtered in the frequency domain with the DFT of a chirp.

Generation of the signal may therefore comprise transforming the set of input symbols x[m] into frequency domain and transforming the transmit filter $g_{TX}[k]$ into the frequency domain, for example by $G_{TX}[n]=DFT_N[g_{TX}][k][n]$. The transformed transmit filter $G_{TX}$ 404 may be applied to the transformed set of input symbols to obtain a frequency domain filtered signal. The frequency domain filtered signal may be further transformed into time domain by IDFT 406. It is appreciated that even though time-frequency transforms have been described using DFT and IDFT as examples, any algorithm suitable for implementing such transform may be applied. For example, DFT and IDFT may be implemented by fast Fourier transform (FFT) and inverse fast Fourier transform (IFFT), respectively. These embodiments generates the signal with a DFT-s-OFDM like of transmitter structure.

Figure 5:
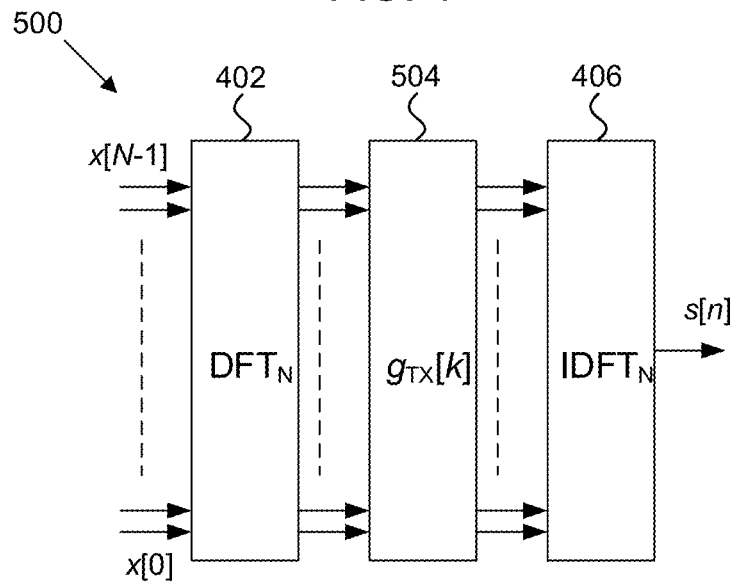
FIG. 5 illustrates an example of a transmission system comprising a chirp based frequency domain transmit filter, according to an embodiment of the disclosure.

FIG. 5 illustrates an example of a transmission system 500 comprising a chirp based frequency domain transmit filter $g_{TX}[k]$ 504, according to an embodiment. Similar to FIG. 4, the transmission system 500 may comprise DFT 402 and IDFT 406. However, the frequency domain filtering may be performed without transforming the time-domain transmit filter into frequency domain. Under certain conditions on the chirp parameters (e.g., N, $\alpha$, $\beta$, $\gamma$), the DFT of a finite chirp is another chirp with modified parameters. This property may be exploited to provide an approximation of a signal which comprises the chirp signal given in (2) or which is generated based on the time-domain transmit filter given in (6). According to an embodiment, the DFT is therefore not performed on the transmit filter and the frequency domain filter is a chirp. The signal s[n] may be generated for example based on $$s[n]=IDFT_N[DFT_N[x][k] \cdot g_{TX}[k]][n] \qquad (11b)$$

Therefore, generation of the signal s[n] may comprise transforming the set of input symbols into a frequency domain, for example by DFT 402, applying a transmit filter $g_{TX}[k]$504 to the transformed set of input symbols to obtain a frequency domain filtered signal, and transform the frequency domain filtered signal into time domain, for example by IDFT 406. The frequency domain transmit filter 504 may be based on the univariate quadratic function of a frequency domain sample index k. The univariate quadratic function may comprise the at least one second degree coefficient, the at least one first degree coefficient, and the at least one zeroth degree coefficient. Coefficients, and values thereof, may be equal to coefficients $\alpha$, $\beta$ and $\gamma$ of (2) and (6). For example, the frequency domain transmit filter may be based on term $$e^{-j\frac{2\pi}{N}p(k)}.$$

These embodiments generate the disclosed signal with a simplified transmitter structure such that the chirp signal is still substantially orthogonal. For example, transformation of the transmit filter into the frequency domain may be avoided.

It is noted that under practical circumstances hardly any signals are purely orthogonal. Therefore, the term 'substantially orthogonal' may be understood such that the chirp signal is sufficiently orthogonal for practical applications, for example such that any deviation from strict orthogonality can be compensated by forward error correction methods applied in practical communication systems. Deviations from strict orthogonality may be due to tolerances in practical implementations or approximations of the above formulations.

Another property is that by using (5) and (6), any $\tau$-step cyclically shifted version of (1) can be generated by using the same transmit filter with $\beta'=\beta+2\alpha\tau$, since $$s[(n+\tau)_N] = \sqrt{N} e^{j\frac{2\pi}{N}\gamma} g_{TX}[\tau] \sum_{m=0}^{N-1} x[m] g_{TX}[n-m] e^{-j\frac{2\pi}{N}2\alpha\tau(n-m)} = \sum_{m=0}^{N-1} x[m] g'_{TX}[n-m] \qquad (12)$$

where $$g'_{TX}[k] = e^{j\frac{2\pi}{N}\gamma} g_{TX}[\tau] e^{-j\frac{2\pi}{N}(\alpha k^2 + (\beta+2\alpha\tau)k+\gamma)}. \qquad (13)$$

This property may be advantageous in receiver implementations performing matched filtering, e.g., where a cyclically shifted replica of the transmitted signal is correlated with the received signal.

Figure 6:
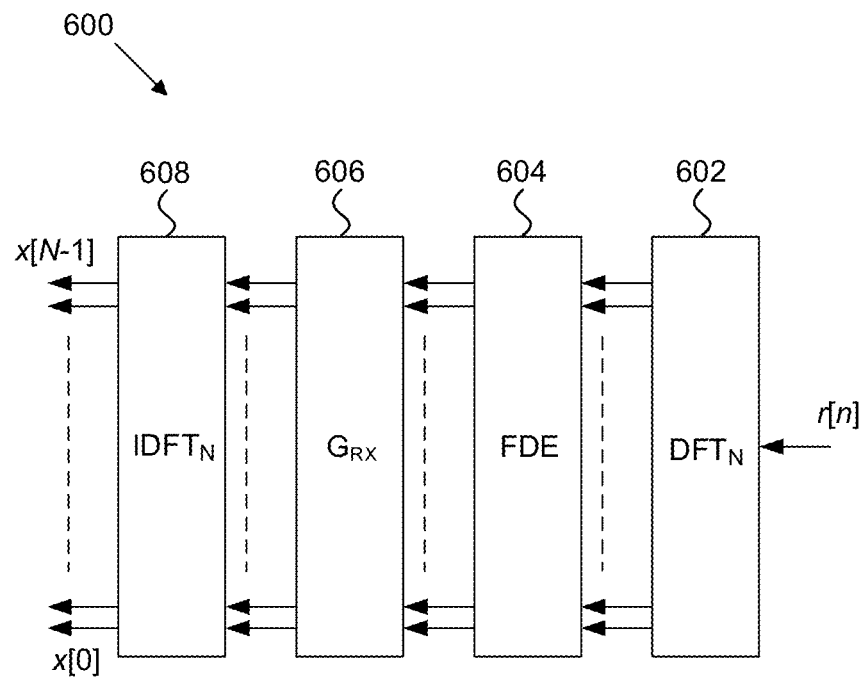
FIG. 6 illustrates an example of a receiver system comprising a frequency domain equalizer and a frequency domain receive filter, according to an embodiment of the disclosure.

FIG. 6 illustrates an example of a receiver system 600 comprising a frequency domain equalizer (FDE) 604 and a frequency domain receive filter 606, according to an embodiment. The frequency domain transmit filter 606 may comprise a transformed chirp based frequency domain transmit filter. The receiver system 600 may comprise an N-point DFT 602 for transforming the received signal r[n] into frequency domain. The receiver system 600 may further comprise the frequency domain equalizer 604 and a transformed chirp based frequency domain receive filter $G_{RX}$ 606. The frequency domain received signal may be equalized in the frequency domain by FDE 604. The frequency domain equalization may be performed to compensate for distortions caused by the transmission channel. The frequency domain equalization may be performed for example based on a channel estimate determined based on known reference signals included in the received signal.

The frequency domain receive filter $G_{RX}$ 606 may be configured to cancel the transmit filter $g_{TX}[k]$. The frequency domain receive filter $G_{RX}$ 606 may for example comprise a frequency domain matched filter corresponding to the transmit filter. The frequency domain receive filter may be obtained by transforming a matched time domain receive filter, for example $g_{RX}[k]=g^*_{TX}[-k]$, into the frequency domain. Estimates of the transmitted symbols x[0], x[1], . . . , x[N−1] may be then obtained based on an N-point IDFT 608 (IDFT-precoder). Therefore, demodulating the received signal r[n] may comprise transforming the received signal into frequency domain, frequency domain equalizing the received signal, applying a frequency domain matched filter, and transforming the frequency domain equalized and filtered signal to time domain. The frequency domain matched filter may be based on a chirp signal comprising a univariate quadratic function of a time domain sample index k. The univariate quadratic function may comprise the at least one second degree coefficient, the at least one first degree coefficient, and the at least one zeroth degree coefficient, as described above. The univariate quadratic polynomial may comprise $p(k)=\alpha k^2+\beta k+\gamma$. The chirp signal may be based on term $$e^{j\frac{2\pi}{N}p(-k)}.$$

Figure 7:
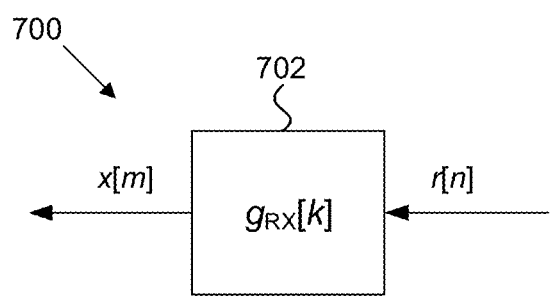
FIG. 7 illustrates an example of a receiver system comprising a time domain receive filter, according to an embodiment of the disclosure.

FIG. 7 illustrates an example of a receiver system 700 comprising a time domain receive filter 702, according to an embodiment. The time domain receive filter 702 may comprise a chirp based time domain receive filter. As discussed with reference to FIG. 3, the disclosed signal may be alternatively generated directly in time domain based on transmit filter $g_{TX}[k]$. It is therefore possible to first equalize the channel and then inverse the filtering operation of (5). Assuming an equalized channel, the basis functions (2) allow for reconstructing the input symbols based on the time domain matched receive filter, $g_{RX}[k]g^*_{TX}[-k]$, which may be, using (7), shown as follows $$\hat{x}[n] = \sum_{m=0}^{N-1} s[m]g_{RX}[n-m] = \sum_{m=0}^{N-1}\sum_{k=0}^{N-1} x[k]g_{TX}[m-k]g^*_{TX}[m-n] = \qquad (14)$$

$$\frac{1}{N}\sum_{k=0}^{N-1} x[k]\sum_{m=0}^{N-1} e^{-j\frac{2\pi}{N}2\alpha m(n-k)} = \sum_{k=0}^{N-1} x[k]\delta[n-k] = x[n]$$

Therefore, demodulating the disclosed signal may comprise applying a time domain matched filter, which is based on a chirp signal comprising a univariate quadratic function of a time domain sample index k. The univariate quadratic function may comprise the at least one second degree coefficient, the at least one first degree coefficient, and the at least one zeroth degree coefficient, as described above. The univariate quadratic polynomial may comprise $p(k)=\alpha k^2+\beta k+\gamma$. The chirp signal may be based on term $$e^{j\frac{2\pi}{N}p(-k)}.$$

According to an embodiment, the generated signal may be dynamically adapted for current channel conditions by selecting suitable polynomial coefficients. The received signal in the frequency domain, after CP removal, can be expressed on vector form as $Y=FHF^\dagger GPX+\eta$ where $\eta$ is additive white Gaussian noise (AWGN), F is the DFT matrix, and the precoder matrix P=F for the chirp waveform and DFT-s-OFDM and P=I for OFDM, where I is the identity matrix. The input symbols are in the N×1 vector X and H is the convolution channel matrix, which is not circulant for a time-selective fading channel and thus $FHF^\dagger$ is not a diagonal matrix. For the chirp waveform, G=diag $(DFT_N[g_{TX}][k])$, k=0, 1, . . . , N−1 and G=I otherwise. Hermitian transpose is denoted by t and all matrices are of dimension N×N. After performing equalization, for example, with a minimum mean square error (MMSE) filter, $E=((FHF^\dagger)^\dagger FHF^\dagger+SNR^{-1}I)^{-1}(FHF^\dagger)^\dagger$ where SNR is the signal-to-noise-ratio, detection may be made from $Z=P^\dagger G^\dagger EY=P^\dagger G^\dagger EFHF^\dagger GPX+P^\dagger G^\dagger E\eta$.

According to an embodiment, the at least one second degree coefficient or the at least one first degree coefficient may be determined by a transmitter. Alternatively, the at least one second degree coefficient and the at least one first degree coefficient may be determined by the transmitter. Alternatively, the at least one second degree coefficient, the at least one first degree coefficient, and the at least one zeroth degree coefficient may be determined by the transmitter. The coefficient(s) may be, for example, dynamically determined during transmission. Determination of the coefficient(s) may be based on a performance condition, which may be associated with current channel conditions such as for example the multipath propagation characteristics or Doppler spread of the channel. Dynamic determination of the coefficient(s) reduce the error rate. For example, define $R=P^\dagger G^\dagger EFHF^\dagger GP$, then $Z=RX+P^\dagger G^\dagger E\eta$ and several criteria can be defined to select good coefficients. The coefficients may be determined for example based on symbol power and inter-symbol interference power.

According to an embodiment, the performance condition may comprise a maximum of a minimum ratio of symbol power and inter-symbol interference power. Symbol power may be determined by $|R[k, k]|^2$, where R[i,j] denotes the element of row i and column j of R. Inter-symbol interference power may be determined by $$\sum_{j\neq k} |R[k, j]|^2.$$

The second and first degree coefficients may be determined by selecting coefficients $\alpha_0$, $\beta_0$, for example from sets of α-values and β-values or combinations of α- and β-values, such that $$(\alpha_0, \beta_0) = \underset{\alpha,\beta}{\mathrm{argmax}}\; \underset{1\leq k\leq N}{\min}\; \frac{|R[k, k]|^2}{\sum_{j\neq k} |R[k, j]|^2}.$$

Another example is to determine the second and first degree coefficients based on a performance condition comprising a maximum of an average ratio of the symbol power and the inter-symbol interference power. For example, the second and first degree coefficients may be determined by selecting coefficients $\alpha_0$, $\beta_0$, for example from the sets of α-values and β-values such that $$(\alpha_0, \beta_0) = \underset{\alpha,\beta}{\mathrm{argmax}} \sum_{k=1}^{N} \frac{|R[k, k]|^2}{\sum_{j\neq k} |R[k, j]|^2}.$$

The determined polynomial coefficients may be determined by a receiver in several different ways. For example, a transmitter may provide the determined coefficients to the receiver over a control channel using a waveform which is known to the receiver. For example the chirp waveform characterized by p(m, n) and p(k) with predetermined polynomial coefficients, or another known waveform. Therefore, a transmitter may include an indication of the at least one second degree coefficient, the at least one first degree coefficient, or the at least one zeroth degree coefficient in at least one control signal or at least one control channel message. Alternatively, the transmitter may include in the control signal or control channel message an indication of a combination of the first and second degree coefficients. The indication may for example include a bit or a combination of bits, where particular values of the bit(s) indicate particular values for the second, first, or zeroth degree coefficients, or combinations of second and first degree coefficients. The mapping between bit values and coefficient values may be predetermined or signaled by the transmitter to the receiver, for example over higher layer signaling such as, for example, Layer 2 signaling. Communication layers may be defined for example based on the Open Systems Interconnection (OSI) model or a layer structure of a particular standard.

According to an embodiment, the determined coefficients may be detected by the receiver. The transmitter may, for example, transmit a reference signal or synchronization signal with the selected coefficients and the receiver may perform a detection of the signal, e.g., using a correlation receiver with several candidate coefficients of pairs of candidate coefficients, and determine the used coefficients based on finding a match between the received signal and a signal that is based on certain candidate set of candidate coefficients. The input symbols x[m] may be predetermined such that the receiver is aware of the transmitted symbols and may therefore determine a set of predetermined (candidate) signals corresponding to different sets of polynomial coefficients, e.g., candidate sets of coefficients. The set of predetermined signals may comprise time domain signals corresponding to the predetermined input symbols and the different sets of coefficients. Alternatively, the predetermined signals may comprise frequency domain signals corresponding to the predetermined input symbols and the different sets of coefficients. It is noted that one or more of the second, first, and zeroth degree coefficients may be fixed and therefore the receiver may perform correlation with respect to coefficients of particular degree(s). For example, the zeroth degree coefficient may be fixed and therefore the receiver may perform correlation with respect to sets of second and first degree coefficients. Therefore, demodulating the received signal may comprise detecting the at least one second degree coefficient and the at least one first degree coefficient based on a correlation of the received signal with a set of predetermined signals corresponding to sets of candidate values for the at least one second degree coefficient and the at least one first degree coefficient, and/or the at least one zeroth degree coefficient. Alternatively, the zeroth degree coefficient and the first degree coefficient, or, the zeroth degree coefficient and the second degree coefficient, may be fixed. Therefore, demodulating the received signal may comprise detecting the at least one second degree coefficient or the at least one first degree coefficient based on a correlation of the received signal with a set of predetermined signals corresponding to sets of candidate values for the at least one second degree coefficient or the at least one first degree coefficient.

As discussed above, the determined values of the coefficients may be also signaled to the receiver. Therefore, the receiver may receive an indication of the at least one second degree coefficient and the at least one first degree coefficient in a control signal or at least one control channel message. Alternatively, the receiver may receive an indication of the at least one second degree coefficient or the at least one first degree coefficient in a control signal or at least one control channel message. Thereby the transmitter is enabled to keep the receiver informed about the dynamically determined value(s) of the polynomial coefficient(s).

According to an embodiment, the generated signal may be used as a reference signal, for example as a synchronization signal that enables a receiver to perform time and/or frequency synchronization. Another application of a reference signal is to provide channel estimates, interference measurements or other measures of channel quality. The reference signal may be a priori known to the receiver. The ability of the receiver to detect a synchronization signal under time and frequency offsets is characterized by the time-frequency ambiguity function, which for an integer valued frequency offset A and time delay i becomes $$\chi(\Delta, \tau) \stackrel{def}{=} \frac{1}{N}\sum_{n=0}^{N-1} s[n]s^*[(n+\tau)_N]e^{j\frac{2\pi}{N}\Delta n} = \qquad (15)$$

$$\frac{1}{N}\sum_{n=0}^{N-1}\sum_{m=0}^{N-1}\sum_{k=0}^{N-1} x[k]g_{TX}[n-k]x^*[m]g_{TX}^*[n+\tau-m]e^{j\frac{2\pi}{N}\Delta n} =$$

$$e^{-j\frac{2\pi}{N}\gamma}\frac{g_{TX}^*[\tau]}{N\sqrt{N}}\sum_{m=0}^{N-1}\sum_{k=0}^{N-1} x[k]x^*[m]e^{-j\frac{2\pi}{N}(\alpha(k^2-m^2)+\beta(m-k)+2\alpha\tau m)}$$

$$\sum_{n=0}^{N-1} e^{j\frac{2\pi}{N}n(\Delta-2\alpha m+2\alpha k+2\alpha\tau)} = \frac{e^{j\frac{2\pi}{N}\gamma}}{\sqrt{N}}g_{TX}^*[\tau]g_{TX}\left[\tau+\frac{\Delta}{2\alpha}\right]$$

$$g_{TX}\left[-\frac{rN}{2\alpha}\right]\left[\sum_{m=0}^{N-1}(-1)^{\frac{\Delta r}{\alpha}}x\left[m-\left(\tau+\frac{\Delta}{2\alpha}\right)+\frac{rN}{2\alpha}\right]x^*[m]e^{j\frac{2\pi}{N}\Delta m}\right.$$

which is based on (8) and (12), and where r is an integer such that $$m' = m - \frac{\Delta}{2\alpha} - \tau + \frac{rN}{2\alpha}$$

becomes an integer fulfilling $0 \leq m' \leq N-1$. From (15), it may be noted that $|\chi(\Delta,\tau)|$ is independent of $\beta$ and $\gamma$, and resembles the DFT of the periodic autocorrelation function of x[m] at delay $$\tau + \frac{\Delta}{2\alpha} - \frac{\tau N}{2\alpha}$$

in the frequency of $\Delta$. It can be also verified that (15) is periodic, i.e., $\chi(\Delta, \tau) = \chi(\Delta+rN, \tau) = \chi(\Delta, \tau+rN)$.

Figure 8:
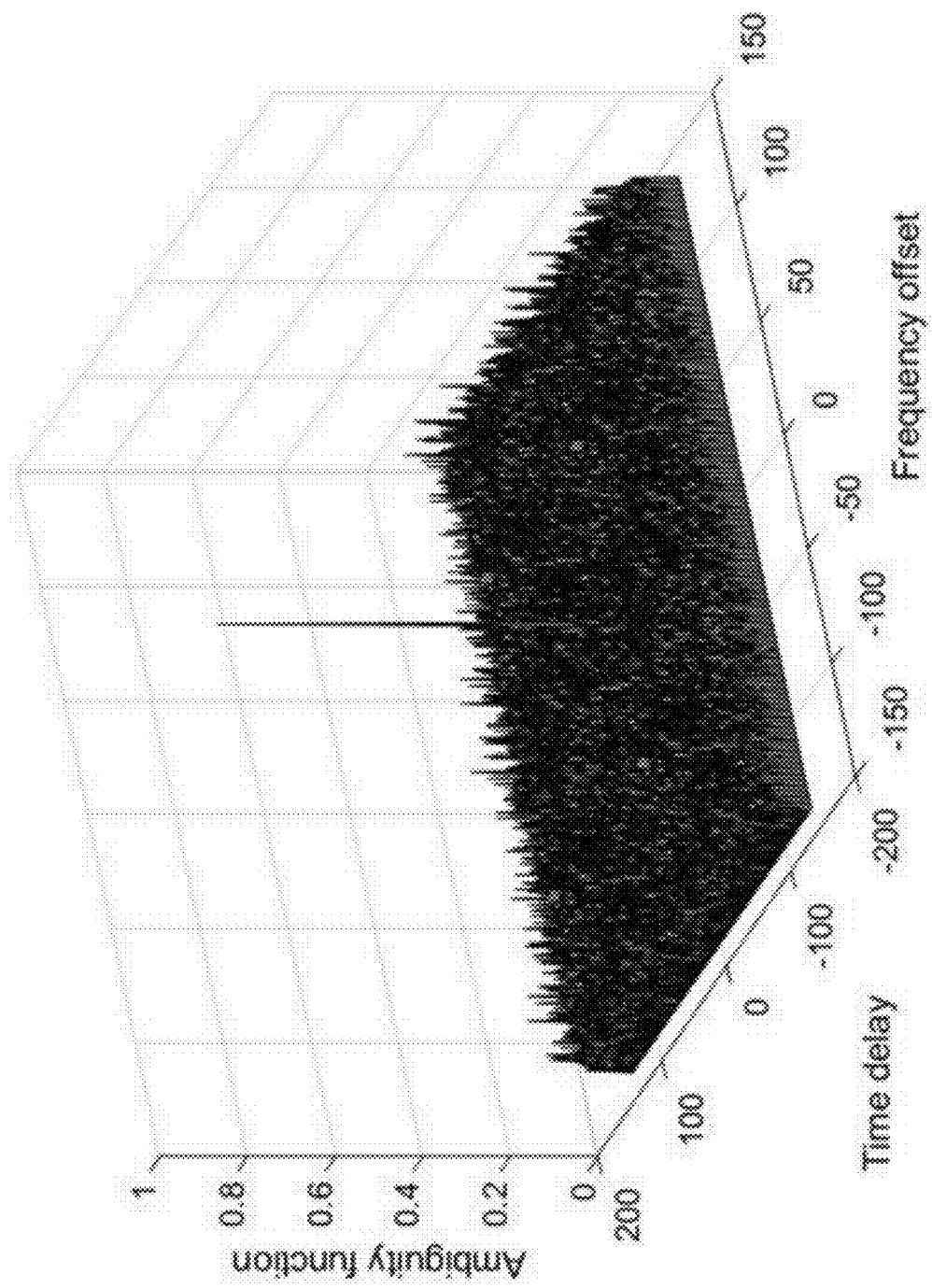
FIG. 8 illustrates an example of a magnitude of a time-frequency ambiguity function with random input symbols with constant magnitude, according to an embodiment of the disclosure.

FIG. 8 illustrates an example of a magnitude of a time-frequency ambiguity function with random input symbols with constant magnitude, according to an embodiment. In this example, the input symbols have been chosen independently and randomly on the unit circle. Under this condition, the expectation value of (15) may be obtained as $$\mathbb{E}[\chi(\Delta \neq 0, \tau \neq 0)] = \qquad (16)$$

$$C\sum_{m=0}^{N-1}\mathbb{E}\left[e^{j2\pi\phi_m}\right]e^{j\frac{2\pi}{N}\Delta m} = C\sum_{m=0}^{N-1}\left(\int_0^1 e^{j2\pi\phi}d\phi\right)e^{j\frac{2\pi}{N}\Delta m} = 0$$

where $$\phi_m = \angle\left((-1)^{\frac{\Delta r}{\alpha}}x\left[m-\left(\tau+\frac{\Delta}{2\alpha}\right)+\frac{rN}{2\alpha}\right]x^*[m]\right)\Big/2\pi$$

becomes a random variable uniformly distributed in [0,1] and C is a constant. Thus, the ambiguity function exhibits a thumbtack-like behavior, which may be desirable for a synchronization signal since multiple time-frequency hypotheses could be tested without ambiguity, due to the distinct peak of the ambiguity function. Therefore, according to an embodiment, the set of input symbols may comprise a set of complex-valued input symbols having a constant magnitude, for example a set of randomly selected complex-valued symbols on the unit circle. In this example, N=139, $\alpha=1$, and $\beta=1$.

Figure 9:
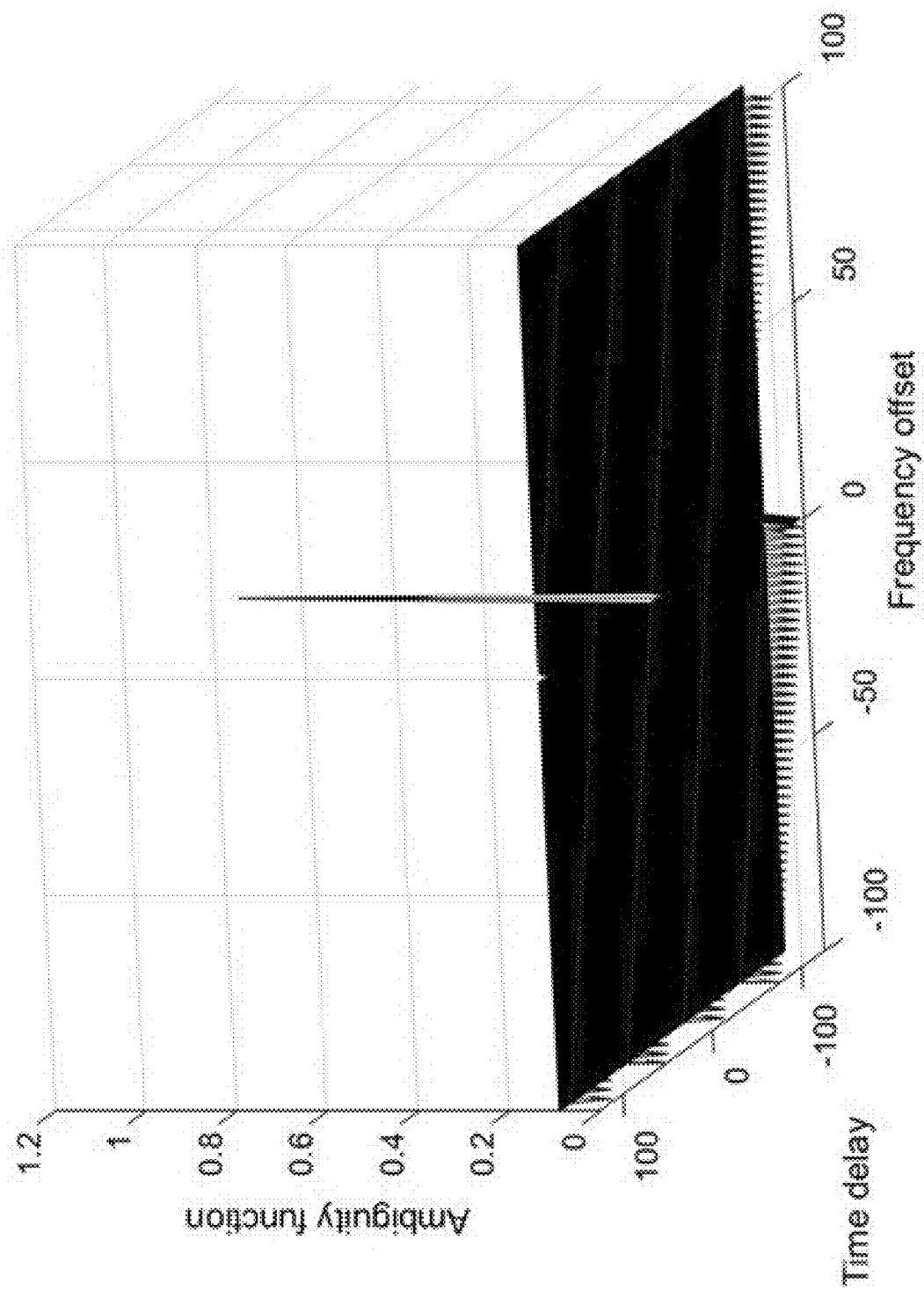
FIG. 9 illustrates an example of a magnitude of a time-frequency ambiguity function with antipodal input symbols based on a maximum length sequence, according to an embodiment of the disclosure.

FIG. 9 illustrates an example of a magnitude of a time-frequency ambiguity function with antipodal input symbols based on an m-sequence, according to an embodiment. If the input symbols are chosen independently and randomly from an M-PSK constellation (e.g., phase shift keying with M constellation points), then when N is large, $\phi_m$ corresponds to one of the constellation points with uniform probability. Therefore, the time-frequency ambiguity function will be thumbtack-like since $$\mathbb{E}[\chi(\Delta \neq 0, \tau \neq 0)] =$$

$$C\sum_{m=0}^{N-1} \mathbb{E}\left[e^{j2\pi\phi_m}\right]e^{j\frac{2\pi}{N}\Delta m} \approx C\sum_{m=0}^{N-1}\left(\sum_{p=0}^{M-1}\frac{1}{M}e^{j\frac{2\pi}{M}p}\right)e^{j\frac{2\pi}{N}\Delta m} = 0.$$

In the example of FIG. 9 the input symbols are antipodal, corresponding to 2-PSK or binary PSK (BPSK). However, any M-PSK constellation may be used. Therefore, according to an embodiment, the set of input symbols may comprise a set of antipodal input symbols or a set of M-PSK input symbols. In the example of FIG. 9, the antipodal input symbols are based on an m-sequence generated based on polynomial $1+D^4+D^7$. Furthermore, in this example N=139, $\alpha=1$, and $\beta=1$.

According to an embodiment, the set of input symbols may be based on a binary sequence, a pseudorandom binary sequence, or a maximum length sequence (m-sequence). For example, the antipodal input symbols, for example taking values +1 or −1, may be determined based on a binary sequence taking values 0 or 1. The binary sequence may comprise a predetermined binary sequence. The binary sequence may comprise a pseudorandom binary sequence, for example a maximum length sequence. In a similar fashion, the set of M-PSK input symbols or the complex-valued input symbols having a constant magnitude may be determined based on the above sequences. For example, particular combinations of consecutive bits of a bit sequence may be mapped to particular M-PSK input symbols or complex-valued input symbols. It is however noted that any suitable means for determining the set of antipodal, M-PSK, or complex-valued input symbols with constant magnitude may be applied. For example, complex-valued sequence(s) or complex-valued pseudorandom sequence(s) may be applied to determine the set of M-PSK input symbols or the complex-valued input symbols having a constant magnitude. A pseudorandom sequence, whether complex-valued or binary, may have statistical characteristics that are identical or close to truly random sequences, but which are predetermined or generated based on a predetermined procedure.

Figure 10:
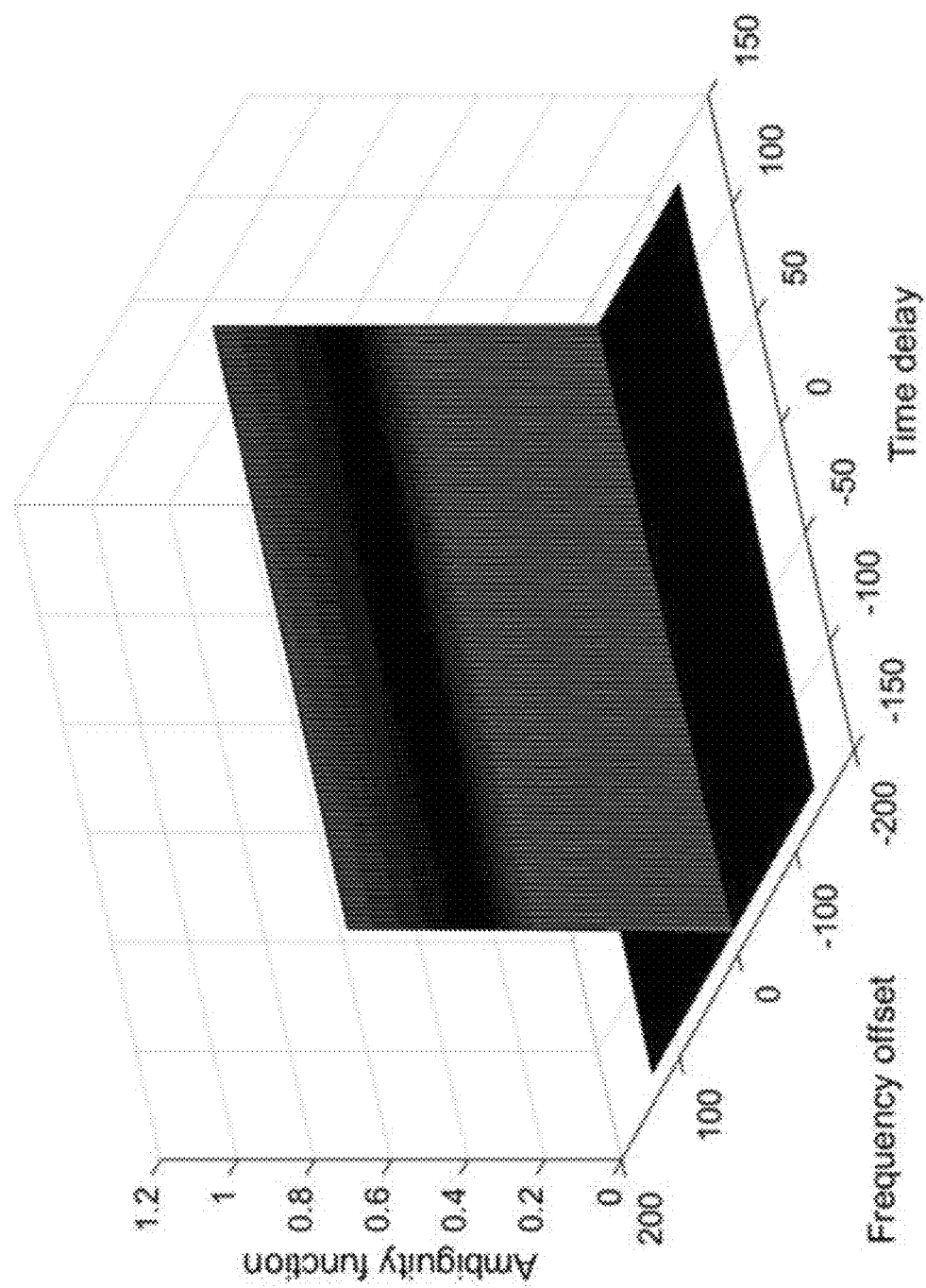
FIG. 10 illustrates an example of a magnitude of a time-frequency ambiguity function with constant input symbols, according to an embodiment of the disclosure.

The time-frequency ambiguity functions of FIG. 8 and FIG. 9 are in contrast to ridge-like ambiguity functions associated with other types of chirp signals. To overcome some issues with a ridge-like ambiguity function, synchronization signals may be transmitted in pairs and an output of two matched filters may be used in detection. It is noted that the above embodiments shape the time-frequency ambiguity function to have a thumbtack-like shape, which may be beneficial for time and frequency synchronization. However, it is noted that based on (15), a ridge-like ambiguity function can also be produced by (1) if x[m]=C, where C is a constant, i.e., $$|\chi(\Delta, \tau)| = \begin{cases} 1, \Delta = 0, \forall \tau \\ 0, \Delta \neq 0, \forall \tau \end{cases}$$

which is shown in FIG. 10. This form of time-frequency ambiguity function may be beneficial for some applications. For example as a radar waveform or when detecting the presence of a signal under large frequency offsets. Therefore, according to an embodiment, the set of input symbols may comprise a set of identical input symbols. In the example of FIG. 10, modulation symbols x[m]=1 are used, =139, $\alpha=1$, and $\beta=1$.

According to an embodiment, the above embodiments may be used to generate a set of substantially orthogonal signals. This may be beneficial for various applications. By defining the cross-ambiguity function $$\chi_{cross}(\Delta, \tau) \stackrel{def}{=} 1/N \sum_{n=0}^{N-1} s_i[n]s_j^*[(n+\tau)_N]e^{j\frac{2\pi}{N}\Delta n},$$

where signal $s_i[n]$ is using input modulation symbols $x_i[m]$, the process can proceed with similar steps as in (15) and find that $\chi_{cross}(0,0)=0$ when $$\sum_{m=0}^{N-1} x_i[m]x_j^*[m] = 0.$$

Thus, orthogonal synchronization signals could be provided by using orthogonal modulation symbol sequences $x_i[m]$. The orthogonal modulation symbol sequences may comprise portions of one or more longer sequences, where the portions are mutually orthogonal over their length. The orthogonal modulation symbol sequences may be mapped to waveforms that are not orthogonal and still a set of orthogonal signals may be obtained.

Alternatively, waveforms with low or zero cross-correlation can be produced using different polynomial coefficients. For example, if it is defined that $$g_{TX,i}[k] = 1/Ne^{-j\frac{2\pi}{N}(\alpha_i k^2 + \beta_i k + \gamma_i)},$$

the magnitude of the cross-correlation between two basis functions with different polynomial coefficients becomes, for i≠j $$\psi(m, p) = \left|\sum_{n=0}^{N-1} g_{TX,i}[n-m]g_{TX,j}^*[n-p]\right| = \left|\frac{1}{N}\sum_{n=0}^{N-1} e^{-j\frac{2\pi}{N}(ln^2+kn)}\right| \quad (17)$$

where $l=\alpha_i-\alpha_j$ and $k=2\alpha_j p-2\alpha_i m+\beta_i-\beta_j$. This can be regarded as the DFT at frequency k of a chirp with rate l. In particular, if it is assumed that l≠0 and k are integers and N is a prime number, it can be shown that V)(m, p)=1/$\sqrt{N}$. For other cases $\psi(m, p)=0$, e.g., if l=0 and k≠0 is an integer. Another example is N=144, $\alpha_i=2.5$, $\alpha_j=0.5$, $\beta_i=-1$, and $\beta_j=1$, where numerical evaluations of (17) give that, by inspection, verify that $$\psi(m, p) = \frac{2}{\sqrt{144}}\left(\left\lceil\frac{p-m+2}{4}\right\rceil - \left\lfloor\frac{p-m+1}{4}\right\rfloor\right)$$

which is zero for certain combinations of m and p. If the modulation symbols $x_i[m]$ form a sequence which is orthogonal with modulation symbols formed by $x_j[m]$ over the indices where ψ(m, p)>0, the signals $s_i[m]$ and $s_j[m]$ can still be made orthogonal. Based on this it is possible to obtain sets of values of the second degree and first degree coefficients such that the generated signals are orthogonal regardless of the set of input symbols [m].

Figure 11:
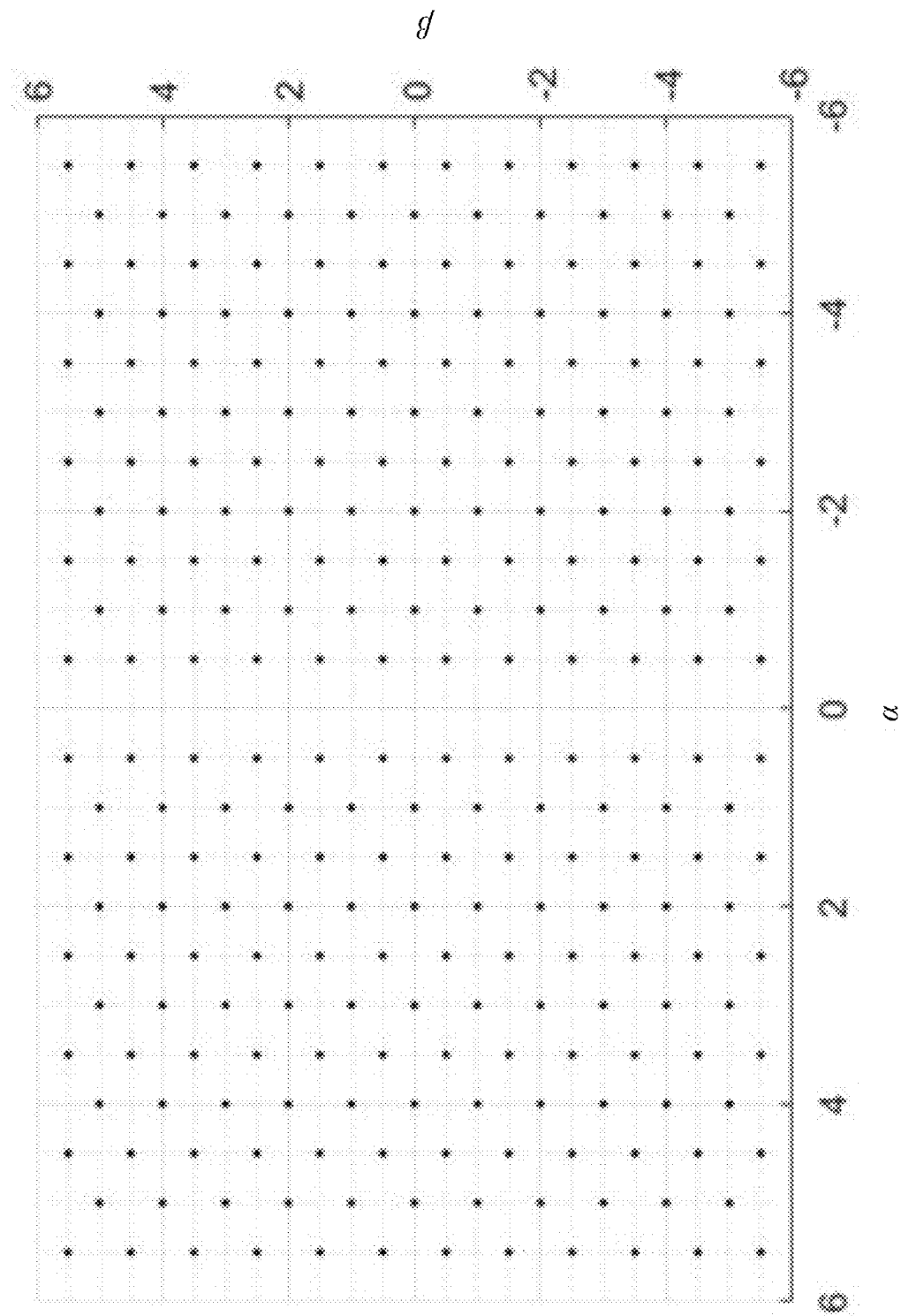
FIG. 11 illustrates an example of valid combinations of second and first degree coefficients for generating orthogonal signals, according to an embodiment of the disclosure.

FIG. 11 illustrates an example of valid combinations of second and first degree coefficients for generating a set of orthogonal signals, according to an embodiment. In this example N=139 and it can be observed that there is a subset of values for the second degree coefficient α and a subset of values for the first degree coefficient β that result in orthogonal signals. It is also observed that the value for the first degree coefficient β may be constrained on the selection of the value of the second degree coefficient α, or vice versa. Therefore, an orthogonal set of signals may be generated based on a subset of combinations of values of the second and first degree coefficients.

Figure 12:
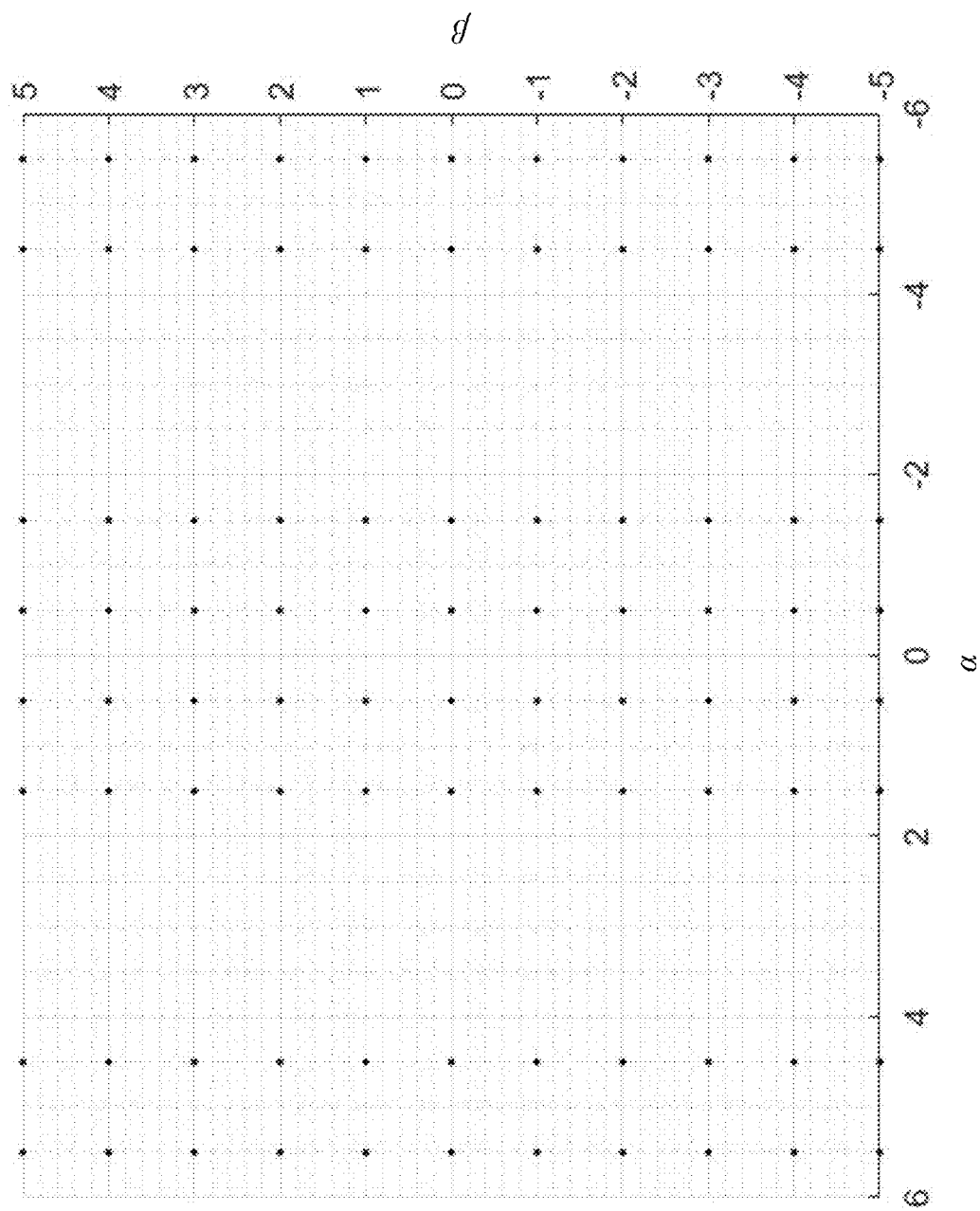
FIG. 12 illustrates another example of valid combinations of second and first degree coefficients for generating orthogonal signals, according to an embodiment of the disclosure.

FIG. 12 illustrates another example of valid combinations of second and first degree coefficients for generating orthogonal signals, according to an embodiment. In this example N=140 and there are independent sets of values for the second degree coefficient α and the first degree coefficient β. For example, it can be observed that after selecting a particular value for the second degree coefficient α, any value from the subset of values for the first degree coefficient β may be still selected. Therefore, an orthogonal set of signals may be generated based on a subset of values for the second degree coefficients and a subset of values for the first degree coefficients.

Figure 13:
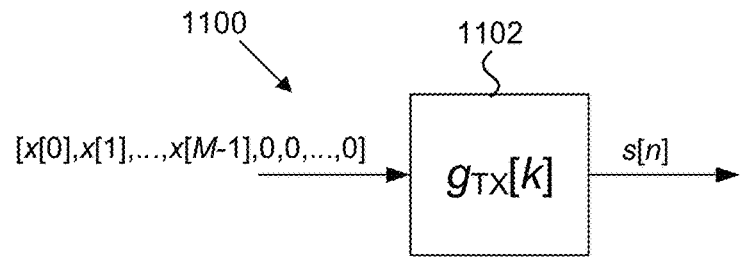
FIG. 13 illustrates an example of a transmission system comprising a time domain transmit filter and configured to modulate a subset of basis functions, according to an embodiment of the disclosure.

FIG. 13 illustrates an example of a transmission system 1100 comprising a time domain transmit filter $g_{TX}[k]$ 1102 and is configured to modulate a subset of basis functions, according to an embodiment. The transmission system 1100 may be used, for example, to divide the set of N input symbols into disjoint subsets in order to multiplex different information streams or users. For example, a subset x[0], x[1], . . . , x[M−1] of input symbols x[0], x[1], . . . , x[N−1], where M<N, may be assigned or allocated to a particular user or a particular information stream. The rest of the input symbols may be set to zero in order to enable these symbols to be assigned to other users. For example, if the subset (Pu contains indices of the basis functions which have been assigned for user u, the signal for user u may be generated based on $$s_u[n] = \sum_{m=0}^{|\Phi_u|-1} x[m] g_{TX}[n - \Phi_u(m)] \tag{18}$$

for $0 \leq n \leq N-1$, where $\Phi_u(m)$ is the m+1:th element of $\Phi_u$.

FIG. 13 illustrates an example, where the M first subcarriers are allocated to user u. In general, disjoint subsets of the input symbols x[m] may be assigned to a plurality of users or information streams.

Figure 14:
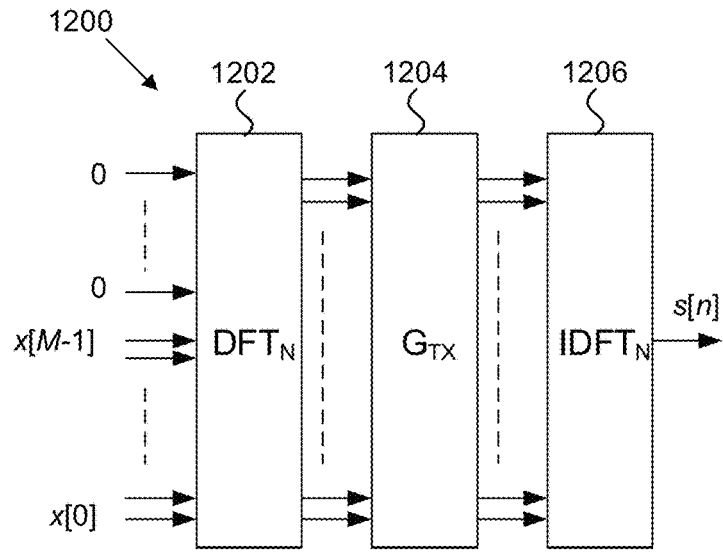
FIG. 14 illustrates an example of a transmission system comprising a transformed chirp based frequency domain transmit filter and configured to modulate a subset of basis functions, according to an embodiment of the disclosure.

FIG. 14 illustrates an example of a transmission system 1200 comprising a frequency domain transmit filter $G_{TX}$ 1204 and configured to modulate a subset of basis functions, according to an embodiment. The frequency domain transmit filter $G_{TX}$ 1204 may comprise a transformed chirp based frequency domain transmit filter. The transmission system 1200 is based on DFT-s-OFDM like structure and comprises an N-point DFT 1202, the frequency domain transmit filter $G_{TX}$ 1204, and an N-point IDFT 1206. For illustrative purposes, zeros are put on input symbols not used for transmission to this particular user. These input symbols may be however modulated by information for other users or information streams. Again, disjoint subsets of input symbols x[m] may be assigned to a plurality of users or information streams.

Figure 15:
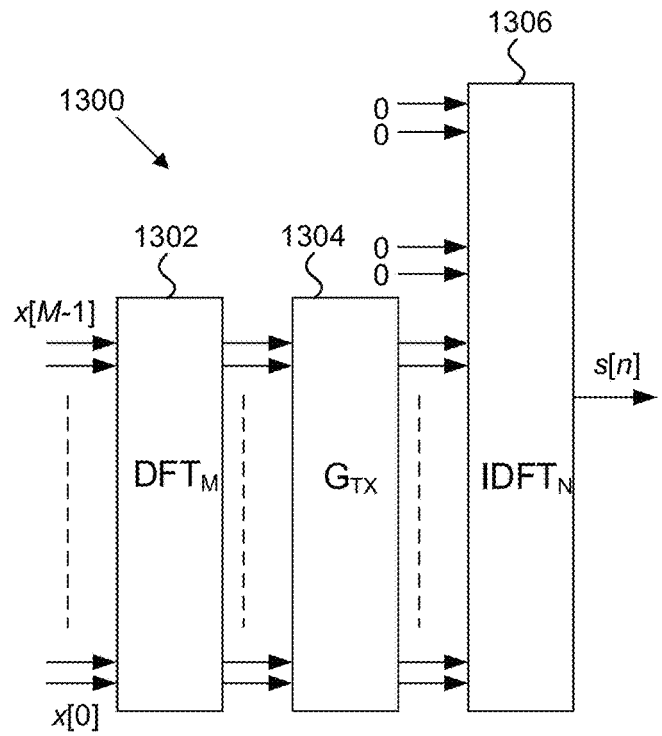
FIG. 15 illustrates another example of a transmission system comprising a frequency domain transmit filter and configured to modulate a subset of basis functions, according to an embodiment of the disclosure.

FIG. 15 illustrates another example of a transmission system 1300 comprising a frequency domain transmit filter $G_{TX}$ 1304 and configured to modulate a subset of basis functions, according to an embodiment. The frequency domain transmit filter $G_{TX}$ 1304 may comprise a transformed chirp based frequency domain transmit filter. This example provides an approximation of (18) and may be used to generate signals with substantially orthogonal chirps. The transmission system 1300 may comprise an M-point DFT 1302, which may be specific to a particular user or information stream, the frequency domain transmit filter $G_{TX}$ 1304, and an N-point IDFT 1306 (M<N) which may be common to a plurality of users or information streams. In this case the frequency domain transmit filter $G_{TX}$ 1304 may comprise a filter obtained based on an M-point DFT of the transmit filter $g_{TX}[k]$. An advantage of this structure is that only an M-point DFT precoder may be needed compared to the transmission system 1200. Generally, the output signal is $$s_u[n] = \frac{1}{\sqrt{N}} \sum_{k=0}^{M-1} \sum_{m=0}^{M-1} x[m] e^{-j\frac{2\pi}{M}mk} \sum_{p=0}^{M-1} \frac{1}{\sqrt{M}} e^{-j\frac{2\pi}{M}(\alpha p^2 + \beta p + \gamma)} e^{-j\frac{2\pi}{M}pk} e^{j\frac{2\pi}{N}n\Phi_u(k)} \tag{19}$$

which reduces to (18) when M=N and is therefore an approximation. A further interpretation of the approximation is that it constitutes an oversampling of the chirp signal due to increasing the IDFT size (from M to N) and using zero padding.

It is noted that the transmission system 300, 400, 500, 1100, 1200, or 1300 may be included in various types of devices such as for example a modulator chipset, a transmitter, a base station, user equipment (UE), a mobile phone, or the like. Similarly, the receiver system 600 or 700 may be included in various types of devices such as for example a demodulator chipset, a receiver, a base station, UE, a mobile phone, or the like. It is further noted that even though some embodiments have been described as time-discrete signals, also corresponding time-continuous signals are intended to be covered. Such time-continuous signals may be for example generated based on the disclosed time-discrete embodiments or they may be otherwise equivalent to or derivable based on the time-discrete embodiments.

Performance of the generated waveform was evaluated on a time-frequency selective channel, i.e., the Extended Vehicular A model (EVA) with a user velocity of 500 km/h at a carrier frequency of 5 GHz and a subcarrier spacing of 1/T=15 kHz. An improved sum-of-sinusoids statistical simulation model was used with 100 sinusoids for generating time-variant fading. The results include the uncoded bit error rate (BER) and the block error rate (BLER). For the BLER, the 3GPP New Radio (NR) polar code with code rate 3/4 is used. In the simulations, N=139.

Figure 16:
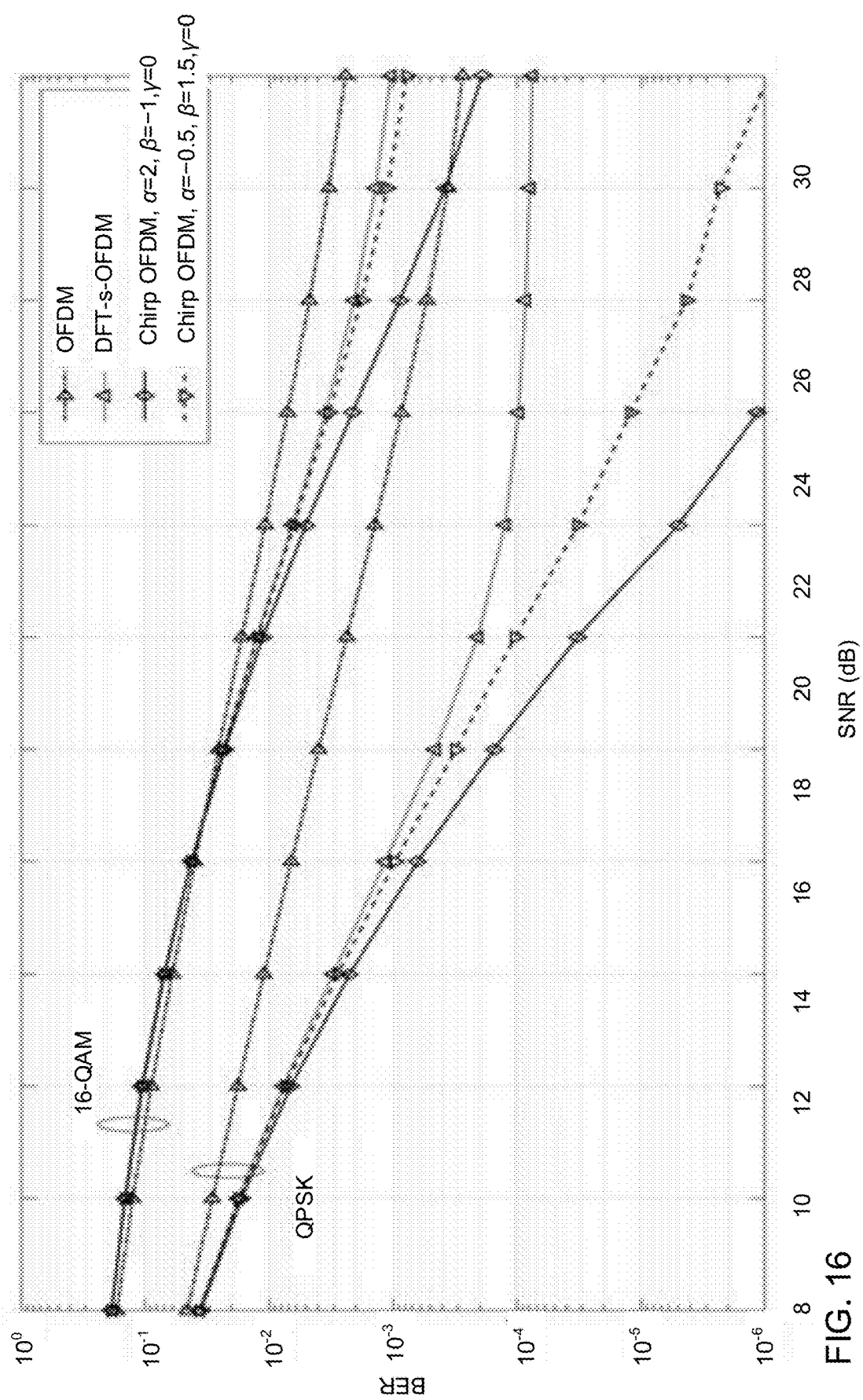
FIG. 16 illustrates an example of a simulated bit-error-rate (BER) performance for different types of signals, according to an embodiment of the disclosure.

FIG. 16 illustrates an example of a simulated BER performance for different types of signals, according to an embodiment. FIG. 16 includes results for Quadrature PSK (QPSK) and 16-Quadratude Amplitude Modulation (16-QAM) modulation and shows that the disclosed chirp waveform outperforms OFDM and DFT-s-OFDM, in terms of uncoded BER. In particular, the chirp waveform avoids the error floor for the BER that exists for OFDM and DFT-s-OFDM. Results from two parameter sets are shown, $(\alpha,\beta)=(2,-1)$ and $(\alpha,\beta)=(-0.5, 1.5)$ and a performance difference can be observed.

Figure 17:
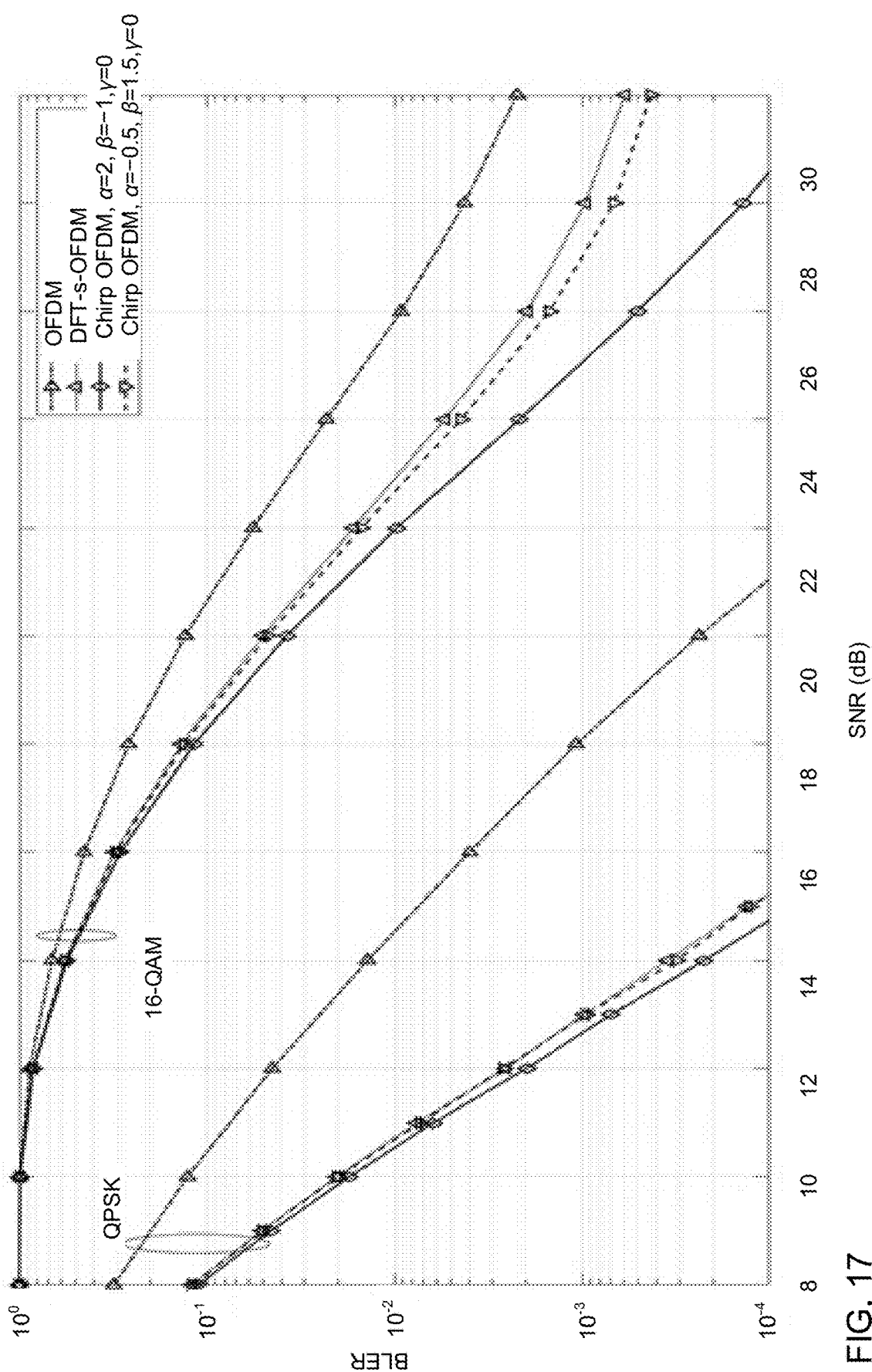
FIG. 17 illustrates an example of a simulated block-error-rate (BLER) performance for different types of signals, according to an embodiment of the disclosure.

FIG. 17 illustrates an example of a simulated BLER performance for different types of signals, according to an embodiment. FIG. 17 shows that gains of the disclosed chirp waveform remain also for the BLER when 3GPP NR Polar code with rate-3/4 is used.

Figure 18:
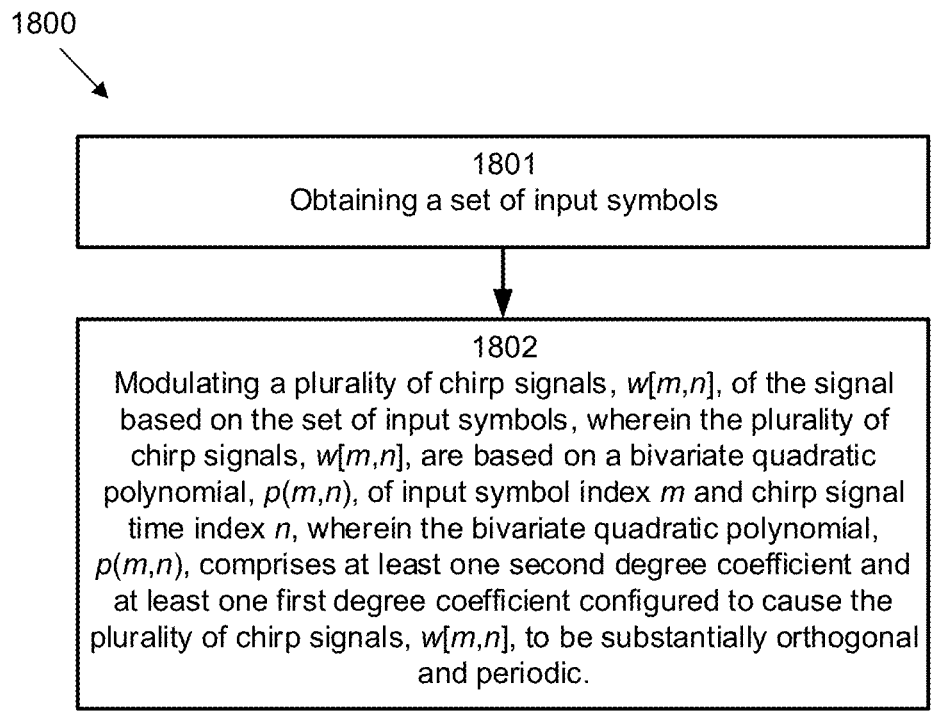
FIG. 18 illustrates an example of a method for generating a signal, according to an embodiment of the disclosure.

FIG. 18 illustrates an example of a method 1800 for generating a signal, according to an embodiment.

At 1801, the method may comprise obtaining a set of input symbols.

At 1802, the method may comprise modulating a plurality of chirp signals, w[m,n], of the signal based on the set of input symbols, wherein the plurality of chirp signals, w[m,n], are based on a bivariate quadratic polynomial, p(m,n), of input symbol index m and chirp signal time index n, wherein the bivariate quadratic polynomial, p(m,n), comprises at least one second degree coefficient and at least one first degree coefficient configured to cause the plurality of chirp signals, w[m,n], to be substantially orthogonal and periodic.

Figure 19:
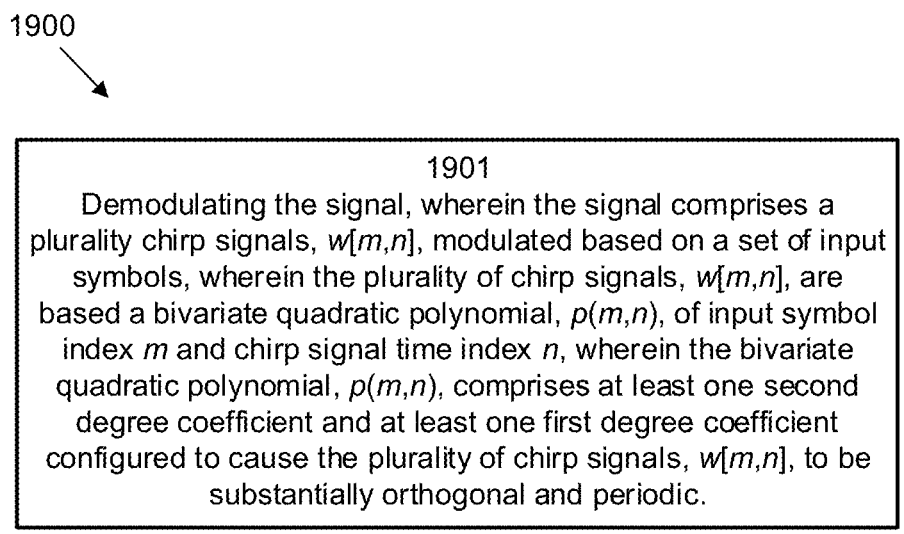
FIG. 19 illustrates an example of a method for receiving a signal, according to an embodiment of the disclosure.

FIG. 19 illustrates an example of a method 1900 for receiving a signal, according to an embodiment.

At 1901, the method may comprise demodulating the signal, wherein the signal comprises a plurality chirp signals, w[m,n], modulated based on a set of input symbols, wherein the plurality of chirp signals, w[m,n], are based a bivariate quadratic polynomial, p(m,n), of input symbol index m and chirp signal time index n, wherein the bivariate quadratic polynomial, p(m,n), comprises at least one second degree coefficient and at least one first degree coefficient configured to cause the plurality of chirp signals, w[m,n], to be substantially orthogonal and periodic.

The above described chirp based orthogonal waveforms may be applied in time-frequency selective channels to improve transmission performance. The above plurality of chirp signals are provided as examples of basis functions for generating a signal. However, alternative basis functions may be also used, as described hereinafter, and therefore a plurality of basis functions used for generating a signal may comprise either a plurality of chirp signals, as described above, or a plurality of other type of basis functions.

As noted above, OFDM multiplexes modulation symbols in the frequency domain by dividing the bandwidth into subcarriers. DFT-s-OFDM multiplexes modulation symbols in the time domain and since a modulation symbol is transmitted over the whole bandwidth of the signal, performance may be better than OFDM due to frequency diversity on a frequency selective channel. On the other hand, for OFDM, a modulation symbol is transmitted over the whole OFDM symbol and performance may be better than DFT-s-OFDM due to time diversity on a time selective channel. For a time-frequency selective channel, orthogonal chirp waveforms may outperform both OFDM and DFT-s-OFDM. A chirp may have a linear time varying frequency, which enables a modulation symbol to be transmitted over the whole bandwidth of the signal and over the whole duration of the chirp, which renders in both time and frequency diversity effects. Certain chirp waveforms, e.g., those utilizing orthogonal and periodic chirps, may be equivalently represented as DFT-s-OFDM with a frequency domain chirp filter and therefore such waveforms may be added to existing systems, for example specifications of the 3GPP, without significantly impacting the transmitter and receiver implementations, while still offering potential performance gains.

OCDM utilizes N periodic and orthogonal chirps as basis functions. The N basis functions may be generated by cyclically shifting a chirp of length N. An OCDM chirp may comprise a complex exponential function with a quadratic polynomial describing its phase, which is varying as function of the time index and having fixed polynomial coefficients. Performance of such signal may be improved by selecting the polynomial coefficients based on the wireless channel impulse response and, as discussed above, a more general waveform may be generated utilizing a chirp defined as $$g_{TX}[k] = \frac{1}{\sqrt{N}} e^{-j\frac{2\pi}{N}(\alpha k^2 + \beta k + \gamma)} \quad (20)$$

The phase of (20) is determined by the exponential function and varies with k. This scheme may be called chirp convolved data transmission (CCDT). Coefficients $\alpha$, $\beta$ and $\gamma$ may be real-valued. Certain conditions, for example those provided in Equations (3) and (4), may be imposed onto a and p to make the chirp basis functions orthogonal and periodic. As provided in the simulation results of FIG. 16 and FIG. 17, the flexibility that CCDT offers in terms of selecting proper coefficients enables CCDT to outperform OCDM in terms of bit error rates on a time-frequency selective channel.

Basis functions of CCDT and OCDM may be constant modulus and they may be generated by cyclic time shifts of a chirp. In discrete time, a basis function, e.g., the chirp, may be regarded as a sequence. Thus, basis functions obtained by cyclic shifts of the chirp will be orthogonal if the chirp has an ideal (perfect) periodic autocorrelation function. An ideal (perfect) periodic autocorrelation function may comprise a zero-valued sequence with a discrete time impulse at the zero delay k=0. An ideal periodic autocorrelation function may therefore comprise a Kronecker delta function $\delta[k]=1$ for k=0 and $\delta[k]=0$ for k≠0. Chirps are an example of constant modulus sequences which have ideal (perfect) periodic autocorrelation function. Generally, such sequences may be referred to as constant amplitude zero autocorrelation (CAZAC) sequences. Therefore, also other type of basis functions may be used to achieve the same or even better performance than chirps. Such sequences may have additional benefits. For example, using a sequence having a smaller alphabet (in terms of possible sample values) compared to chirps may reduce implementation complexity since the transmitter and receiver could generate the basis function with less unique sample values. Furthermore, some sequences may not come with parameters, or they may have less parameters, which are to be selected, for example, based on wireless channel conditions. This may reduce an amount of signaling between the transmitter 110 and the receiver 130 and reduce the need for methods for parameter selection and thus the need to provide such methods with input data, e.g., radio channel parameters. Embodiments of the present disclosure therefore provide a waveform which utilizes orthogonal basis functions, where each basis function carries a modulation symbol and modulation symbols are multiplexed over both the time and frequency domain. This improves transmission performance for applications on time-frequency selective channels. By using a waveform generated based on cyclic shifts of a more general basis function, the selection of the chirp polynomial coefficients, as for example in the case of CCDT waveform, may be avoided. However, transmitter and receiver implementation may be still provided based on filtered DFT-s-OFDM structures. Enabling use of other sequences for basis functions also gives more flexibility to system design.

According to an embodiment, a device may obtain a set of modulation symbols for generating a signal. The set of modulation symbols may comprise a set of input symbols to the device. The device may be a modulator of the transmitter 110. Alternatively, the device may be the transmitter 110. The modulation symbols may comprise data symbols, e.g., carrying data for one or more applications, or preconfigured reference symbols such as for example channel estimation pilot symbols or synchronization symbols. The modulation symbols may be real-valued or complex-valued and be extracted form a constellation, for example a QAM constellation such as QPSK or 16-QAM, or be based on a complex-valued or real-valued sequence. The device may modulate the basis functions based on the set of modulation symbols to generate the signal. For example, the device may multiply each of the basis functions with one of the set of modulation symbols. The modulated basis functions obtained by the multiplications may be summed.

The basis functions may comprise cyclically shifted versions of one basis function. A periodic autocorrelation function of the basis function may comprise an ideal (perfect) periodic autocorrelation function. However, the basis functions may exclude (i.e. not comprise) a chirp signal configured with a phase being variable based on a bivariate quadratic polynomial including a zeroth degree coefficient which is dependent on a maximum number of the plurality of basis functions. The set of basis functions may therefore exclude chirps of an OCDM signal. The maximum number of basis functions may be equal to a maximum number of basis functions in the system, for example a number of basis functions for which the plurality of signals can be still made orthogonal or substantially orthogonal. Since the basis function has an ideal (perfect) periodic autocorrelation function, each cyclic shift of the basis function will be orthogonal to each other and the maximum number of basis functions may be equal to the length of basis function sequence. It is however noted that all basis functions may not be modulated in some embodiments, for example to enable multi-user multiplexing, or the like. The generated waveform may be considered as a multicarrier signal (or symbol) comprising a plurality of modulated basis functions. The basis functions may further exclude a chirp signal configured with a phase being variable based on a bivariate quadratic polynomial including any zeroth degree coefficient ($\gamma$). The basis functions may further exclude a chirp signal configured with a phase being variable based on a bivariate quadratic polynomial, where the zeroth degree coefficient is equal to zero. The set of basis functions may therefore further exclude chirps of a CCDT signal.

The generated signal (waveform) s[n] may be expressed in discrete time by a circular convolution $$s[n] = \sum_{m=0}^{N-1} x[m] g_{TX}[n - m(\text{mod} N)], \quad (21)$$

where x[m] comprises the modulation symbols, $g_{TX}[n-m \pmod{N}]$ is an m th cyclically shifted basis function, and (mod N) denotes the modulo-N operator. The device may transmit a continuous time version of the generated signal. The basis function $g_{TX}[n]$,n= 0, 1, . . . , N−1, may have an ideal (perfect) periodic autocorrelation function, which implies that:

$$\sum_{n=0}^{N-1} g_{TX}[n + t(\text{mod} N)] g_{TX}^*[n] = \sum_{n=0}^{N-1} |g_{TX}[n]|^2 \cdot \delta[t] \quad (22)$$

where $\delta[k]$ is a Kronecker delta function $\delta[k]=1$ for k=0 and $\delta[k]=0$ for k≠0, and where t is an integer. Operator $(\cdot)^*$ denotes complex conjugate and $|\cdot|$ denotes absolute value. The basis function may for example comprise a Björck sequence, a Frank sequence, a generalized chirp-like sequence (GCL), a Zadoff-Chu sequence, a CAZAC sequence, a modulatable CAZAC sequence, or a binary-to-biphase transformation of a maximum length sequence.

Any of the above sequences may be used as the basis function to generate the signal. For example, a Zadoff-Chu sequence may be defined by $$x_u[n] = \exp\left(-j \frac{\pi u n (n + c_f + 2q)}{N_{ZC}}\right),$$

where $0 \le n < N_{ZC}$, $0 \le u < N_{ZC}$, $\gcd(N_{ZC}, u)=1$, $c_f = N_{ZC} \mod 2$, and $q \in \mathbb{Z}$ is from the set of integers $\mathbb{Z}$, $\gcd(A, B)$ is the greatest common divisor of A and B, and where $N_{ZC}$ is the length of the Zadoff-Chu sequence. In one example, the basis function may comprise $x_u[n]$,n=0, 1, . . . ,$N_{ZC}$−1. The plurality of basis functions may be obtained by different cyclic shifts of $x_u[n]$, that is, $x_u[n-m]$, where m is the modulation symbol index. Hence, the basis function, i.e. the Zadoff-Chu sequence in this example, may be cyclically shifted by one sample for each modulation symbol.

A GCL sequence may be constructed by modulating a Zadoff-Chu sequence with a unimodular sequence. A CAZAC sequence may have a constant amplitude and an ideal (perfect) periodic autocorrelation function. A CAZAC sequence may be called a modulatable CAZAC sequence (MCAZAC) if it is possible to represent it as a product of a first sequence and a second sequence, where second sequence comprises a periodically extended version of a third sequence, and where the length of the first sequence is an integer multiple of the length of the third sequence. Björck sequences are one type of CAZAC sequences which are defined for prime lengths larger than 2. Another form of CAZAC sequence consists of applying a binary-to-biphase (BTB) alphabet transform on a maximum length sequence. A Frank sequence has ideal (perfect) auto-correlation characteristics. An example of a Frank sequence has been disclosed in "Phase Shift Pulse Codes with Good Periodic Correlation Properties", IRE Transactions on Information Theory, Volume 8, Issue 6, pp. 381–382, on October 1962. Examples of Zadoff-Chu sequences are presented in the following document: D. C. Chu, "Polyphase codes with good periodic correlation properties," IEEE Trans. Inf. Theory, vol. 18, no. 4, pp. 531-532, July 1972. Examples of modulatable CAZAC sequences are provided in the following document: N. Suehiro and M. Hatori, "Modulatable orthogonal sequences and their applications to SSMA systems," IEEE Trans. Inf. Theory, vol. 34, no. 1, pp. 93-100, January 1988. Examples of Björck sequences are provided in the following document: G. Björck, "Functions of modulus 1 on Zn whose Fourier transforms have constant modulus, and "cyclic n-roots"," in J. S. Byrnes, and J. F. Byrnes (eds.), Recent Advances in Fourier Analysis and Its Applications. NATO-ASI Series C, vol. 315, pp. 131-140. Kluwer Academic Publishers, Dordrecht (1990). An example of BTB alphabet transform is provided in the following document: B. M. Popovic, "Fourier duals of Björck sequences," In Proc. Sequences and Their Applications—SETA 2010: 6th International Conference, Paris, France, Sep. 13-17, 2010.

The basis function may alternatively comprise a chirp of the CCDT signal, for example a chirp signal configured with a phase being variable based on a bivariate quadratic polynomial $p(m, n) = \alpha m^2 + \alpha n^2 - 2\alpha nm + \beta n - \beta m + \gamma$ of the modulation symbol index m and a basis function time index n. Coefficients $\alpha$, $\beta$ and $\gamma$ may be real-valued coefficients. The zeroth degree coefficient $\gamma$ may be independent of the maximum number of basis functions, N.

Referring back to FIG. 3, the transmission system 300 may generate signals based on applying a time domain transmit filter 302 corresponding to the basis function $g_{TX}[n]$. The time domain transmit filter 302 may be applied on the set of modulation symbols x[m] in the time domain. The transmission system 300 may be configured to apply any of the basis functions described herein to generate the signal s[n]. The generated waveform may be represented in continuous time $0 \leq t < T$ by $$s(t) = \sum_{m=0}^{N-1} x[m] g_{TX}\left(t - \frac{mT}{N}\right), \quad (23)$$

where the basis function $g_{TX}(t)$ is the time domain transmit filter 302 (i.e. working as pulse shaping on the modulation symbols) and where x[m] is taken from the set of (real-valued or complex valued) modulation symbols. When $N > 1$, s(t) can be viewed as a multicarrier waveform. Its time discrete representation for $$t = \frac{nT}{N}$$

for n=0, 1, . . . , N−1 is given by $$s[n] = \sum_{m=0}^{N-1} x[m] g_{TX}[n - m]. \quad (24)$$

Thus, $g_{TX}[n]$ may be regarded as a sequence that is defined for n=−(N−1), −N+2, . . . , N−1. A cyclic extension may be added to the generated signal. The cyclic extension may be defined for example by applying (23) in the time interval $-T_{CP} \leq t < T$, or by applying (24) for the samples $-N_{CP} \leq n < N$. A cyclic extension may be used as a guard period between (multicarrier) symbols to remove inter-symbol interference (ISI), i.e., acting as a cyclic prefix. The cyclic prefix also transforms the linear convolution of the signal and the channel to a circular convolution and therefore enables simple receiver structures using one-tap frequency domain equalization.

The signal s[n] may be therefore generated in time domain based on a convolution of the set of modulation symbols x[m] with the basis function $g_{TX}[n]$, where n=0, 1, . . . , N−1, where $g_{TX}[n-m]$ is an mth cyclically shifted basis function, and where and m is an integer (the modulation symbol index). The convolution may comprise $$s[n] = \sum_{m=0}^{N-1} x[m] g_{TX}[n - m].$$

The following orthogonality condition may apply to $g_{TX}[n]$:

$$\sum_{n=0}^{N-1} g_{TX}[n - m] g_{TX}^*[n - p] = \sum_{n=0}^{N-1} |g_{TX}[n]|^2 \cdot \delta[m - p], \quad (25)$$

where $(\cdot)^*$ is the complex conjugate operator, (mod N) is the modulo-N operator, $|\cdot|$ denotes the absolute value.

The transmit filter $g_{TX}[n]$ may further satisfy a periodicity condition $$g_{TX}[n] = g_{TX}[n \pm N]. \quad (26)$$

Parameter N may be an integer and N may be larger than or equal to the number of the set of modulation symbols x[m].

Utilizing (26), the condition of (25) becomes a periodic autocorrelation function and it may be alternatively expressed for an integer t=p−m to yield (22). Therefore, the mth cyclically shifted basis function $g_{TX}[n-m]$ may satisfy (22).

The condition of (25) may referred to as an ideal (or perfect) periodic autocorrelation function, which is non-zero only for zero delay, t=0. As noted above, sequences fulfilling $|g_{TX}[n]| = C_0$ and (25), where $C_0$ is a constant, may be referred to as CAZAC sequences, examples of which include chirp sequences (e.g., as used in CCDT), Zadoff-Chu sequences, GCL sequences, modulatable CAZAC sequences, Björck sequences, and Frank sequences, etc. Such sequences may be therefore used as a basis function for generating orthogonal multicarrier waveforms.

Due to the periodicity (26), the waveform may be represented with the modulo-N operator (mod N). If $g_{TX}[n]$ is defined for $0 \leq n \leq N-1$, the generated signal s[n] may be expressed as:

$$s[n] = \sum_{m=0}^{N-1} x[m] g_{TX}[n - m(\text{mod} N)] \quad (27)$$

A cyclic extension may be added to the generated signal. The cyclic extension may be defined for example by applying (27) for the samples $-N_{CP} \leq n < N$.

To provide an alternative view on condition (25), a DFT may be performed at frequency k of the periodic autocorrelation function of the transmit filter, $$\rho_{gg}[t] = \sum_{m=0}^{N-1} g_{TX}[n + t(\text{mod } N)] g_{TX}^*[n],$$

for a delay t=p−m, such that:

$$\sum_{t=0}^{N-1} \rho_{gg}[t] e^{-j\frac{2\pi kt}{N}} \overset{def}{=} \quad (28)$$

$$\sum_{t=0}^{N-1} \sum_{n=0}^{N-1} g_{TX}[n - m(\text{mod} N)] g_{TX}^*[n - p(\text{mod} N)] e^{-j\frac{2\pi kt}{N}} =$$

$$\sum_{t=0}^{N-1} \sum_{n=0}^{N-1} g_{TX}[n - p + t(\text{mod} N)] g_{TX}^*[n - p(\text{mod} N)] e^{-j\frac{2\pi kt}{N}} =$$

$$\sum_{t=0}^{N-1} \sum_{n=0}^{N-1} g_{TX}[n + t(\text{mod} N)] g_{TX}^*[n] e^{-j\frac{2\pi kt}{N}} =$$

-continued $$\sum_{n=0}^{N-1} g_{TX}^*[n] \sum_{t=0}^{N-1} g_{TX}[n+t(\mathrm{mod}N)]e^{-j\frac{2\pi kt}{N}} =$$

$$\sum_{n=0}^{N-1} g_{TX}^*[n]e^{j\frac{2\pi kn}{N}} \sum_{t=0}^{N-1} g_{TX}[n+t(\mathrm{mod}N)]e^{-j\frac{2\pi k(n+t)}{N}} = G_{TX}^*[k]G_{TX}[k] =$$

$$|G_{TX}[k]|^2 = \sum_{n=0}^{N-1} g_{TX}^*[n]e^{j\frac{2\pi kn}{N}} \sum_{t=0}^{N-1} g_{TX}[n+t(\mathrm{mod}N)]e^{-j\frac{2\pi k(n+t)}{N}} =$$

$$G_{TX}^*[k]G_{TX}[k] = |G_{TX}[k]|^2 = \sum_{n=0}^{N-1} g_{TX}^*[n]e^{j\frac{2\pi kn}{N}}$$

$$\sum_{t=0}^{N-1} g_{TX}[n+t(\mathrm{mod}N)]e^{-j\frac{2\pi k(n+t)}{N}} = G_{TX}^*[k]G_{TX}[k] = |G_{TX}[k]|^2$$

Thus, if $|G_{TX}[k]|^2 = C_1$ (constant) for all k, it follows (since the DFT of a constant is an impulse) that the periodic autocorrelation function is on the form $\rho_{gg}[t] = C_2\delta[t]$, i.e., $g_{TX}[n]$ is a sequence with a zero-autocorrelation (ZAC) property. As an example, $G_{TX}[k] = \sqrt{C_1}e^{j\phi_k}$ for any sequence of angles $\phi_k$ fulfills the condition $|G_{TX}[k]|^2 = C_1$.

It is observed that Equation (24) constitutes a linear convolution of the set of modulation symbols and the transmit filter. Moreover, due to the periodicity condition of (26), $g_{TX}[n-m(\mathrm{mod}\ N)] = g_{TX}[n-m]$ and therefore, $$\sum_{m=0}^{N-1} x[m]g_{TX}[n-m\,(\mathrm{mod}\,N)] = \sum_{m=0}^{N-1} x[m]g_{TX}[n-m] = s[n], \quad (29)$$

which is the circular convolution between x[m] and $g_{TX}[k]$. Hence, by defining the vectors $x = (x[0], x[1], \ldots, x[N-1])'$ and $g_{TX} = (g_{TX}[0], g_{TX}[1], \ldots, g_{TX}[N-1])'$ the signal $s = (s[0], s[1], \ldots, s[N-1])'$ may be equivalently generated by $$s = IDFT_N[DFT_N[x] \cdot DFT_N[g_{TX}]] \quad (30)$$

where $(\cdot)'$ is the vector transpose, $IDFT_N[y]$ and $DFT_N[y]$ are the N-point inverse DFT (IDFT) and DFT of the vector y, respectively. Based on (30), the waveform s[n] of (24) may be viewed as DFT-s-OFDM where the DFT-precoded data is filtered in the frequency domain with the DFT of the transmit filter. Since $DFT_N[g_{TX}] = G_{TX}$ and $|G_{TX}[k]|^2 = C_1$ for all k, the implementation complexity is comparatively small because filtering with $G_{TX}$ just corresponds to performing N phase shifts on the elements in $DFT_N[x]$. A cyclic extension may be added to the generated signal. The cyclic extension may be defined for example by applying (30) for the samples $-N_{CP} \le n < N$, wherein $s[n] = s[n+N]$ for $-N_{CP} \le n \le -1$.

Referring back to FIG. 4, the transmission system 400 may generate waveforms based on applying a frequency domain transmit filter 404 (denoted in this example by $G_{TX}[k]$). This may be done based on Equation (30) derived above. The transmission system 400 may transform the set of modulation symbols x[m] into frequency domain, for example by DFT 402. The DFT 402 may be of size N. The set of modulation symbols may comprise modulation symbols x[m], where $m = 0, 1, \ldots, N-1$. At the frequency domain, the set of transformed modulation symbols may be filtered based on a multiplication of the transformed modulation symbols with the frequency domain transmit filter 404 to obtain a frequency domain filtered signal. As derived above, the frequency domain transmit filter 404 may satisfy $|G_{TX}[k]|^2 = C_1$ for a frequency index $k = 0, 1, \ldots, N-1$. The frequency domain transmit filter 404 may further satisfy $G_{TX}[k] = \sqrt{C_1}e^{j\phi_k}$ for a sequence of real values $\phi_k$ (angles), where $\phi_k$ is not constant for $k = 0, 1, \ldots, N-1$. If the angles are constant, $\phi_k = \phi_0$, the filter reduces to a phase shift that is common to all frequencies k. Such a signal will essentially become a DFT-s-OFDM signal. The frequency domain transmit filter $G_{TX}[k]$ may be obtained from the discrete Fourier transform of the basis function $g_{TX}[n]$ for a frequency index $k = 0, 1, \ldots, N-1$. Again, N may be an integer, which is larger than or equal (as in the example of FIG. 4) to the number of the set of modulation symbols (some of which may be set to zero). The frequency domain filtered signal may be transformed back to the time domain, for example by IDFT 406. The IDFT may be also of size N. This enables a DFT-s-OFDM type generation of the waveform in frequency domain. The transmission system 400 may be configured to apply any of the frequency domain transmit filters described herein to generate the signal s[n].

The signal generated based on the above basis functions may be configured to have advantageous autocorrelation properties, as provided below. The signal may be therefore advantageously used as a synchronization signal to enable receiver(s) to perform synchronization. The periodic autocorrelation function may be derived for the signal s[n] of (24) as follows:

$$\rho_{ss}[t] \stackrel{\mathrm{def}}{=} \frac{1}{N}\sum_{n=0}^{N-1} s[n]s^*[n+t(\mathrm{mod}N)] = \quad (31)$$

$$\frac{1}{N}\sum_{n=0}^{N-1}\sum_{m=0}^{N-1}\sum_{k=0}^{N-1} x[k]g_{TX}[n-k(\mathrm{mod}N)]x^*[m]g_{TX}^*[n+t-m(\mathrm{mod}N)] =$$

$$\frac{1}{N}\sum_{m=0}^{N-1}\sum_{k=0}^{N-1} x[k]x^*[m]\rho_{gg}[t-m+k(\mathrm{mod}N)] =$$

$$\frac{1}{N}\sum_{m=0}^{N-1}\sum_{k=0}^{N-1} x[k]x^*[m]\delta[t-m+k(\mathrm{mod}N)] =$$

$$\frac{1}{N}\sum_{m=0}^{N-1} x[m-t(\mathrm{mod}N)]x^*[m] = \rho_{xx}[t]$$

where it is assumed that $$\sum_{m=0}^{N-1} |g_{TX}[n]|^2 = 1.$$

Thus, the autocorrelation function of the signal s[n] reduces to the autocorrelation of the modulation symbol sequence x[m] comprising the set of modulation symbols. This is useful if the waveform is used as a synchronization signal, since the modulation symbol sequence could be chosen to shape the autocorrelation function of the signal. From (31) it follows that if the modulation sequence has a ZAC property, then also the signal s[n] of (24) has the ZAC property Thus, the autocorrelation function of the signal s[n] reduces to the autocorrelation of the modulation symbol sequence. Therefore, according to an embodiment, the set of modulation symbols may comprise a constant amplitude sequence, a CAZAC sequence, a modulatable CAZAC sequence, or a set of quadrature amplitude modulation symbols. Such sequences may have suitable (e.g., ideal, perfect) autocorrelation properties, which are inherited by the generated signal. The set of modulation symbols may comprise preconfigured reference symbols, such as for example synchronization symbols. The values of preconfigured reference symbols may be for example defined in a standard and be preconfigured at the transmitter 110 and the receiver 130 accordingly. The signal s[n] generated based on such sequences may comprise a synchronization signal, which may be alternatively viewed as a multicarrier synchronization symbol.

Signals generated based on the above basis functions may be further configured to have advantageous cross-correlation properties. For some applications it may be desired to be able to construct a set of orthogonal signals. For example, the modulation symbol sequence could be pre-determined and the signal s[n] could be used as a synchronization signal or a reference signal. As shown below, orthogonal signals could be provided by using a set of orthogonal modulation symbol sequences $x_i[m]$.

$$\rho_{s_1 s_2}[t] \stackrel{def}{=} \frac{1}{N} \sum_{n=0}^{N-1} s_1[n] s_2^*[n + t(\mathrm{mod}N)] = \quad (32)$$

$$\frac{1}{N} \sum_{n=0}^{N-1} \sum_{m=0}^{N-1} \sum_{k=0}^{N-1} x_1[k] g_{TX}[n - k(\mathrm{mod}N)] x_2^*[m] g_{TX}^*[n + t - m(\mathrm{mod}N)] =$$

$$\frac{1}{N} \sum_{m=0}^{N-1} \sum_{k=0}^{N-1} x_1[k] x_2^*[m] \rho_{gg}[t - m + k(\mathrm{mod}N)] =$$

$$\frac{1}{N} \sum_{m=0}^{N-1} \sum_{k=0}^{N-1} x_1[k] x_2^*[m] \delta[t - m + k(\mathrm{mod}N)] =$$

$$\frac{1}{N} \sum_{m=0}^{N-1} x_1[m - t(\mathrm{mod}N)] x_2^*[m] = \rho_{x_1 x_2}[t]$$

For example, if $x_1[m]$ is a CAZAC sequence and $x_2[m] = x_1[m+p \, (\mathrm{mod} \, N)]$, where $p \neq 0$, then these are two orthogonal sequences. Consequently, signals $s_1[n]$ and $s_2[n]$ generated based on $x_1[m]$ and $x_2[m]$ as modulation symbol sequences are orthogonal. Therefore, according to an embodiment, the set of modulation symbols x[m] may comprise a modulation symbol sequence selected from a set of orthogonal modulation symbol sequences (including e.g., $x_1[m]$ and $x_2[m]$), where different sequences of the set may be orthogonal to each other. The set of orthogonal modulation symbol sequences may comprise, for example, a set of Björck sequences, a set of Frank sequences, a set of GCL sequences, a set of Hadamard sequences, a set of DFT sequences, a set of CAZAC sequences, or a set of modulatable CAZAC sequences. The set of modulation symbols may comprise preconfigured reference symbols, such as for example synchronization symbols or channel estimation reference symbols. The signal s[n] generated based on such sequences may therefore comprise a synchronization signal and/or a reference signal to aid channel estimation, which may be alternatively viewed as a multicarrier synchronization and/or a multicarrier reference symbol.

One example of a set of orthogonal modulation symbol sequences are DFT sequences, i.e., $$x[m] = e^{j\frac{2\pi}{N}mp},$$

p=0, 1, . . . , N−1. This sequence has benefits in terms of producing a signal with small power variations. The output of the DFT-precoder for an input DFT sequence will be X[k]=δ[p]. Therefore, only subcarrier p will be modulated and the transmitted signal becomes $$s[n] = G_{TX}[p] e^{j\frac{2\pi}{N}np}.$$

This implies that the signal has constant magnitude, i.e., |s[n]| is independent of n. This is advantageous as it minimizes the transmit power variations in the transmitter and produces a signal with low peak-to-average-power-ratio (PAPR). A set of Hadamard sequences may correspond to rows or columns of the Hadamard matrix having entries of +1 or −1, where the rows and columns are orthogonal.

Referring back to FIG. 13, the transmission system 1100 comprising the time domain transmit filter 1102 may be configured to enable user multiplexing or data multiplexing. The set of (N) modulation symbols provided as input to the time domain transmit filter 1102 may be divided into disjoint subsets in order to multiplex different information streams or users, as already described above with reference to FIG. 13. Different subsets may be allocated to different users or information (data) streams. In the example of FIG. 13, the M first symbols are allocated. The subset x[0], x[1], . . . , x[M−1] of modulation symbols x[0], x[1], . . . , x[N−1], where M<N, may be assigned or allocated to a particular user or a particular information stream. The rest of the modulation symbols may be set to zero in order to enable these symbols to be assigned to other users. This procedure may be applied for example if the transmission system 110 is located at a UE such as a mobile phone. However, if the transmission system 1100 is located at a base station, or a UE transmits multiple information streams, the subset x[0], x[1], . . . , x[M−1] may be allocated to the particular user or information stream and the rest of the modulation symbols may comprise modulation symbols of other user(s) or information stream(s). The transmission system 1100 may be configured to apply any of the basis functions described herein to generate the signal s[n].

Referring back to FIG. 14, the transmission system 1200 comprising the frequency domain transmit filter $G_{TX}$ 1204 may be configured to enable user multiplexing or data multiplexing. The set of (N) modulation symbols provided as input to the DFT 1202 may be divided into disjoint subsets in order to multiplex different information streams or users, as already described above with reference to FIG. 14. The transmission system 1200 provides an alternative transmitter structure using DFT-s-OFDM. Symbols not used for transmission to the particular user or information stream may be set to zero. These symbols may be however modulated by information for other users or streams, similar to the example of transmission system 1100. The transmission system 1200 may be configured to apply any of the frequency domain transmit filters described herein to generate the signal s[n].

Referring back to FIG. 15, the transmission system 1300 may comprise a frequency domain transmit filter $G_{TX}$ 1304 and be configured to modulate a subset of basis functions. The frequency domain transmit filter $G_{TX}$ 1304 may comprise any of the frequency domain transmit filters described herein. This example provides an approximation of (30) and may be used to generate signals with substantially orthogonal basis functions, i.e., basis functions with low (or zero) cross-correlation. An advantage of transmission system

1300 is that only an M-point DFT precoder is needed compared to the transmission system 1200. This reduces computational complexity. The approximate solution may be expressed as:

$$\tilde{s}[n] = \frac{1}{\sqrt{N}} \sum_{k=0}^{N-1} X[k] G_{TX}[k] e^{j\frac{2\pi}{N}nk} = \quad (33)$$

$$\frac{1}{N} \sum_{k=0}^{N-1} \sum_{p=0}^{M-1} \sum_{m=0}^{M-1} x[p] g_{TX}[m] e^{-j\frac{2\pi}{M}kp} e^{-j\frac{2\pi}{M}km} e^{j\frac{2\pi}{N}nk} =$$

$$\frac{1}{N} \sum_{p=0}^{M-1} \sum_{m=0}^{M-1} x[p] g_{TX}[m] \sum_{k=0}^{N-1} e^{j\frac{2\pi}{N}k\left(n - \frac{N}{M}p - \frac{N}{M}m\right)}$$

If N/M is an integer and n=ńN/M for ń=0, 1, ..., M−1, then $$\sum_{k=0}^{N-1} e^{j\frac{2\pi}{N}k\left(n - \frac{N}{M}p - \frac{N}{M}m\right)} = N\delta\left[\acute{n} - p - m(\mathrm{mod}N)\right].$$

It follows that, $$\tilde{s}[\acute{n}] = \sum_{p=0}^{M-1} x[p] g_{TX}\left[\acute{n} - p \,(\mathrm{mod}\, N)\right] = s[\acute{n}],$$

which is an N/M-times upsampled version of s[n]. If N/M is not an integer, $$\tilde{s}[n] = \frac{1}{N} \sum_{p=0}^{M-1} \sum_{m=0}^{M-1} x[p] g_{TX}[m] \frac{1 - e^{j\frac{2\pi}{N}N\left(n - \frac{N}{M}p - \frac{N}{M}m\right)}}{1 - e^{j\frac{2\pi}{N}\left(n - \frac{N}{M}p - \frac{N}{M}m\right)}}.$$

The transmission system 1300 may therefore transform the set of modulation symbols x[m] into the frequency domain with a DFT 1302 of size M. The frequency domain filtered signal, obtained by applying the frequency domain transmit filter $G_{TX}$ 1304, may be transformed into the time domain based on an IDFT 1306 of size N. The size of the IDFT 1306 may be larger than the size of the DFT 1302 (N>M). The frequency domain filtered signal output by the frequency domain transmit filter 1304 may be padded with (N−M) zeros before providing it to the IDFT 1306.

The basis functions may include parameters which may need to be known by the receiver 130 to demodulate the signal and by the transmitter 110 to transmit the signal. An example of such parameter is the root index of a Zadoff-Chu sequence. In one embodiment, waveform parameter(s) may be predefined, for example in a standard, and therefore be assumed to be known by the receiver 130. In another embodiment, waveform parameter(s) may be implicitly derived from either the transmitted waveform or from other signals associated with the waveform. For example, certain time-frequency resource(s) may be allocated to indicate given waveform parameter(s). For example, value(s) of modulation symbol(s) carried on such time-frequency resource(s) may be used to indicate value(s) of the sequence parameter(s). In another embodiment, waveform parameters may be explicitly signaled to the receiver 130. For example, an indication of parameter(s) of the basis function may be included in at least one control signal or at least one control channel message. This may include physical layer signaling and/or higher layer signaling such as for example medium access control (MAC) signaling, e.g., a MAC control element (CE), or radio resource control (RRC) signaling, or combinations thereof. In general, higher layer signaling may comprise signaling defined above the physical layer of the OSI (Open Systems Interconnect) model, or a particular standard applied. In general, the transmitter may provide an indication of a type of basis function, for example whether the basis function comprises a Björck sequence, a Frank sequence, a GCL sequence, a Zadoff-Chu sequence, a CAZAC sequence, a modulatable CAZAC sequence, or a binary-to-biphase transformation of a maximum length sequence, or parameter(s) of the applicable sequence. The generated signal can be transmitted both in downlink and uplink of a communications system. For uplink transmission, signaling of waveform parameters is from the system (e.g., base station) to the device (e.g., UE), which performs transmission accordingly.

The receiver 130 may be configured to demodulate the signals described herein. Referring back to FIG. 7, the receiver system 700 may comprise a time domain receive filter $g_{RX}[k]$ 702 configured to reconstruct the modulation symbols x[m] based on the received signal r[n]. The receive filter $g_{RX}[k]$ 702 may comprise a matched filter $g_{RX}[k]=g_{TX}[-k]$, corresponding to the basis function $g_{TX}[k]$. For example, the receiver system 700 may reconstruct the set of modulation symbols based on the matched receive filter $g_{RX}[k]=g^*_{TX}[-k]$, where $g_{TX}[n-m]$ is an mth cyclically shifted basis function. As described above the mth cyclically shifted basis function may satisfy (22) and the transmit filter may satisfy (26). This enables reconstructing the set of modulation symbols in time domain.

Referring back to FIG. 6, the receiver system 600 may comprise a frequency domain receive filter $G_{RX}$ 606 configured to reconstruct the modulation symbols x[m] based on the received signal r[n]. As already described above, the receiver system 600 may transform the received signal into frequency domain, for example by the DFT 602. The set of modulation symbols of the received signal may be equalized in the frequency domain by the frequency domain equalizer 604. The equalization may be based on a channel estimate determined based on channel estimation reference symbol(s), which may be provided by the transmitter 130, as described above. The equalized set of modulation symbols may be then filtered based a multiplication of the equalized set of modulation symbols with the frequency domain receive filter $G_{RX}$ 606, which may comprise a frequency domain transformation of the matched receive filter $g_{RX}[k]$. The filtered set of modulation symbols provided by the frequency domain receive filter $G_{RX}$ 606 may be then transformed to time domain by IDFT 608. The DFT 602 and the IDFT 608 may be of size N. The reception system 600 may be configured to apply a frequency domain transformation of a time domain matched receive filter corresponding to any of the basis functions described herein.

As described above, the transmitter 110 may provide the receiver with an indication of a type and/or parameter(s) of the basis function as signaling information. The receiver 130 may receive this indication and demodulate the signal based on the parameter(s). For example, if the transmitter 110 indicates a particular root index of a Zadoff-Chu sequence, the receiver 130 may generate a corresponding sequence and use it as a basis function when demodulating the received signal. Furthermore, if the set of modulation symbols comprises preconfigured reference symbols, the receiver 130 may perform channel estimation (and equalization) based on the preconfigured reference symbols. If the set of modulation symbols comprises synchronization symbols, the receiver 130 may perform synchronization based on the synchronization symbols.

The disclosed waveform was evaluated on a time-frequency selective channel, i.e., the Vehicular A model (VA) with a user velocity of 500 km/h at a carrier frequency of 5 GHz and a subcarrier spacing of 1/T=15 kHz. Frequency domain minimum means square error (MMSE) receiver was used. The results show the uncoded BER for 16-QAM.

Figure 20:
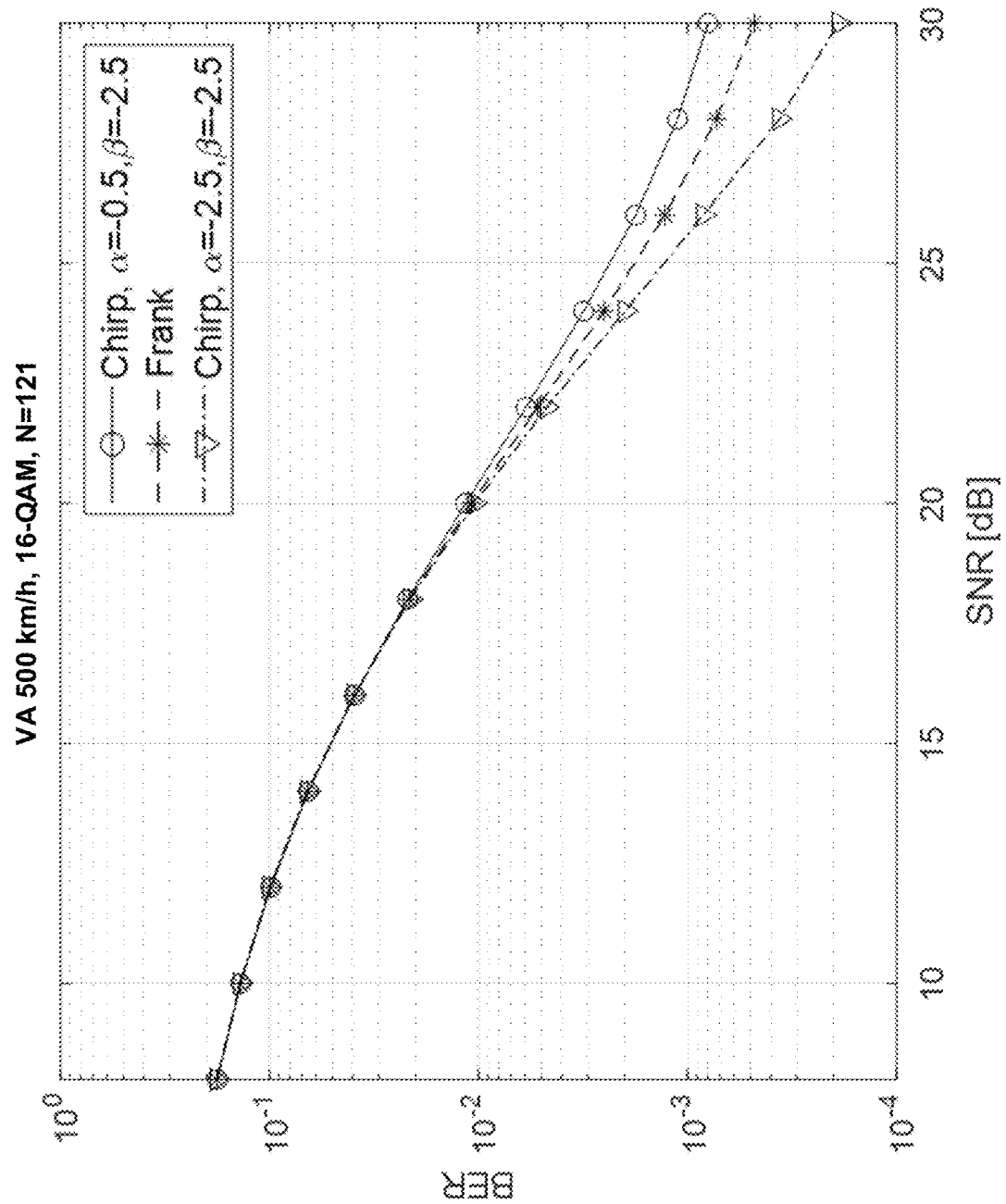
FIG. 20 illustrates an example of a simulated BER performance for two chirp signals and a Frank sequence based signal, according to an embodiment of the disclosure.

FIG. 20 illustrates an example of a simulated BER performance for two chirp signals and a Frank sequence-based signal. In this example, N=121. It is observed that BER performance of the Frank sequence is between performance of the chirp signals with different $\alpha$ values ($\alpha$=0.5 or $\alpha$=2.5, $\beta$=2.5). It can be shown numerically that the alphabet size is ~50% smaller for the Frank sequence than for the chirp.

Figure 21:
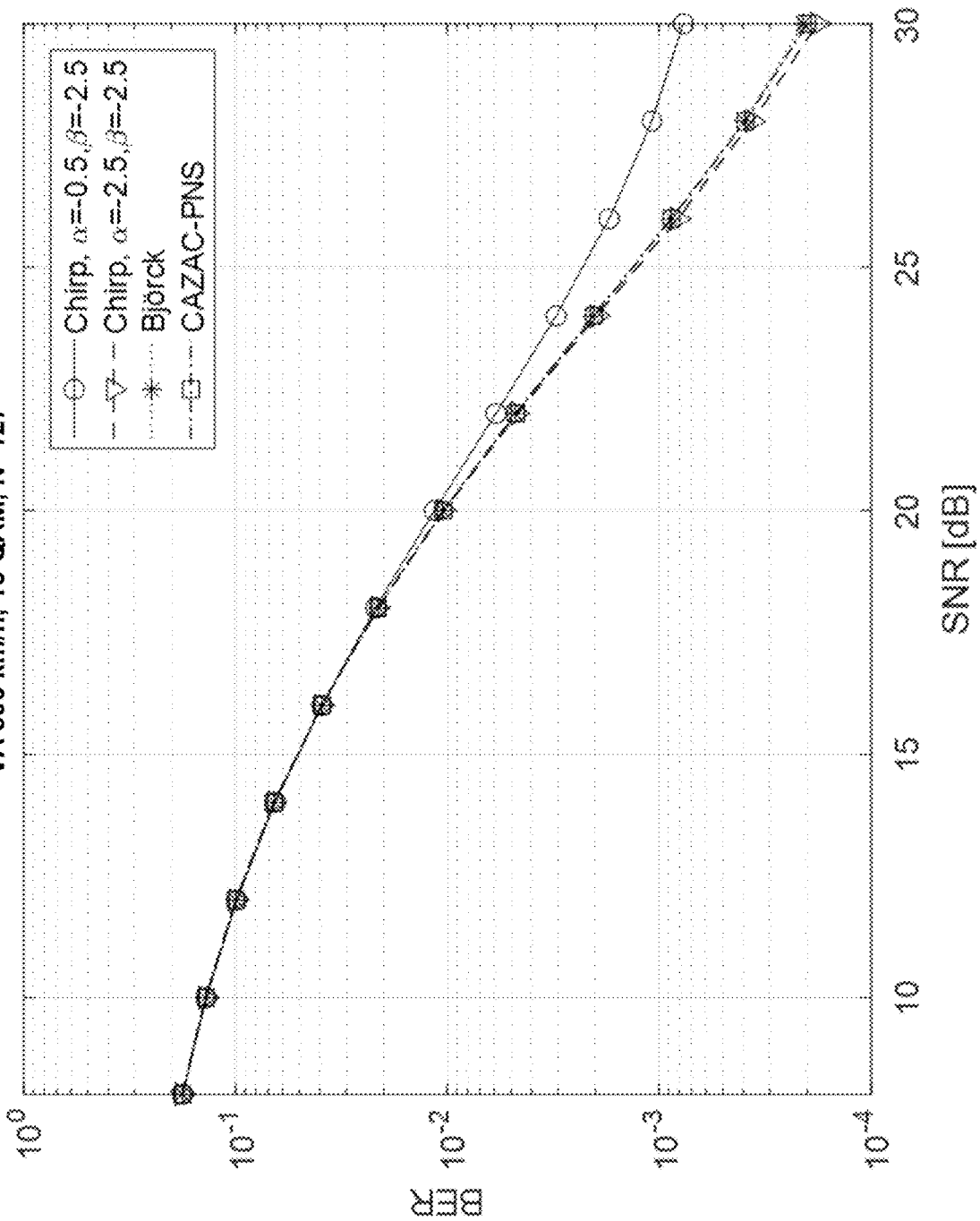
FIG. 21 illustrates an example of a simulated BER performance for two chirp signals, a Björck sequence based signal, and binary-to-biphase transformation of maximum length sequence (CAZAC-PNS), according to an embodiment of the disclosure.

FIG. 21 illustrates an example of a simulated BER performance for two chirp signals, a Björck sequence-based signal, and binary-to-biphase transformation of maximum length sequence (CAZAC-PNS). The chirp parameters are identical to those of FIG. 20, but in this example, N=127. It is observed that the BER performance of the Björck sequence and the CAZAC-PNS are comparable to the best chirp. It can be shown numerically that the alphabet size is equal to 2 for the Björck and CAZAC-PNS sequences, while it is close to N for the chirp. Hence, a significant reduction in implementation complexity may occur.

Figure 22:
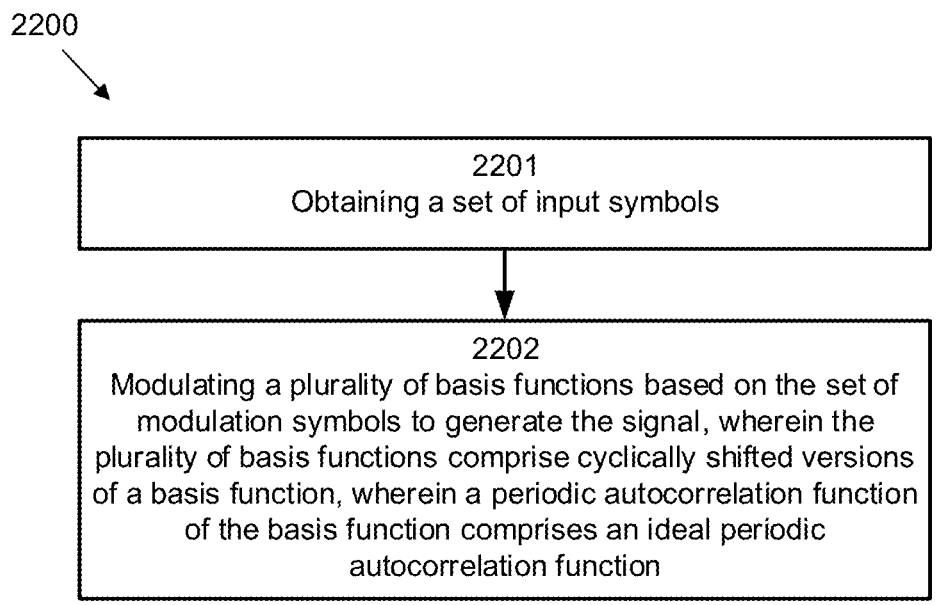
FIG. 22 illustrates an example of a method for generating a signal, according to an embodiment of the disclosure.

FIG. 22 illustrates an example of a method 2200 for generating a signal, according to an embodiment.

At 2201, the method may comprise obtaining a set of input symbols.

At 2202, the method may comprise modulating a plurality of basis functions based on the set of modulation symbols to generate the signal, wherein the plurality of basis functions comprise cyclically shifted versions of a basis function, wherein a periodic autocorrelation function of the basis function comprises an ideal (perfect) periodic autocorrelation function.

Figure 23:
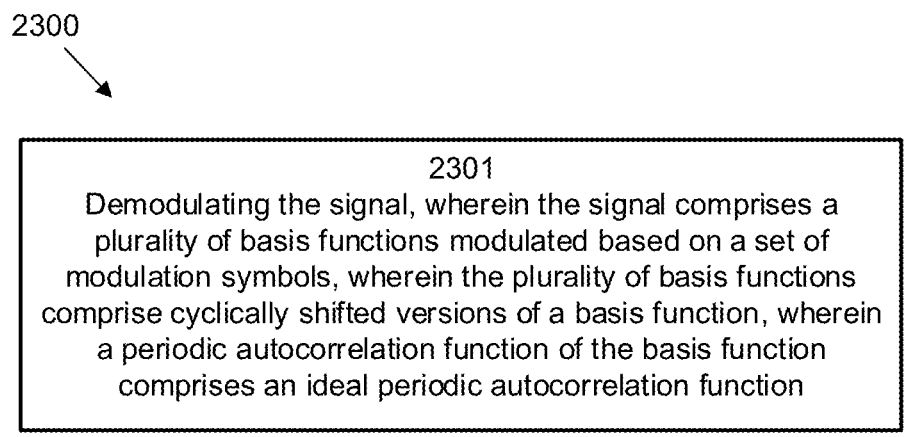
FIG. 23 illustrates an example of a method for receiving a signal, according to an embodiment of the disclosure.

FIG. 23 illustrates an example of a method 2300 for receiving a signal, according to an embodiment.

At 2301, the method may comprise demodulating the signal, wherein the signal comprises a plurality of basis functions modulated based on a set of modulation symbols, wherein the plurality of basis functions comprise cyclically shifted versions of a basis function, wherein a periodic autocorrelation function of the basis function comprises an ideal (perfect) periodic autocorrelation function.

Further features of the methods disclosed herein may directly result from the functionalities and parameters of the methods and devices, for example transmitter 110, device 200, transmission systems 300, 400, 500, 1100, 1200, 1300, receiver 130, or receiver systems 600, 700, as described in the appended claims and throughout the specification and are therefore not repeated here.

A device or a system may be configured to perform or cause performance of any aspect of the method(s) described herein. Further, a computer program may comprise program code configured to cause performance of an aspect of the method(s) described herein, when the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A device for generating a signal, comprising:
at least one processor; and
one or more memories including computer instructions that, when executed by the at least one processor, cause the device to perform operations comprising:
obtaining a set of modulation symbols; and
modulating a plurality of basis functions, based on the set of modulation symbols, to generate the signal, wherein:
the plurality of basis functions comprise cyclically shifted versions of a basis function,
a periodic autocorrelation function of the basis function comprises a perfect periodic autocorrelation function, and
the basis function comprises a chirp signal configured with a phase being variable based on a bivariate quadratic polynomial $p(m, n) = \alpha m^2 + \alpha n^2 - 2\alpha nm + \beta n - \beta m + \gamma$ of a modulation symbol index m and a basis function time index n=0, 1, . . . , N−1, where $\alpha$, $\beta$ and $\gamma$ are real-valued coefficients, and N is an integer.

2. The device according to claim 1, wherein the basis function comprises a Björck sequence, a Frank sequence, a generalized chirp-like sequence (GCL), a Zadoff-Chu sequence, a constant amplitude zero-autocorrelation (CAZAC) sequence, a modulatable CAZAC sequence, or a binary-to-biphase transformation of a maximum length sequence.

3. The device according to claim 1, wherein the plurality of basis functions excludes chirps generated by orthogonal chirp division multiplexing.

4. The device according to claim 1, wherein the plurality of basis functions excludes chirps generated by chirp convolved data transmission.

5. The device according to claim 1, wherein
   γ is independent of a maximum number of the plurality of basis functions, and
   N is larger than or equal to a number of modulation symbols in the set of modulation symbols.

6. The device according to claim 1, wherein the operations further comprise summing the plurality of modulated basis functions.

7. The device according to claim 1, wherein the operations further comprise:
   generating the signal s[n] in a time domain based on a circular convolution $$s[n] = \sum_{m=0}^{N-1} x[m] g_{TX}[n - m(\text{mod} N)],$$

where x[m] comprises the set of modulation symbols, $g_{TX}[n-m(\text{mod } N)]$ is an m th cyclically shifted basis function, and wherein the basis function $g_{TX}[n]$, n=0, 1, ..., N−1, satisfies $$\sum_{n=0}^{N-1} g_{TX}[n + t(\text{mod} N)] g_{TX}^*[n] = \sum_{n=0}^{N-1} |g_{TX}[n]|^2 \cdot \delta[t],$$

where δ[k] is a Kronecker delta function δ[k]=1 for k=0 and δ[k]=0 for k≠0, m is a modulation symbol index, t is an integer, (·)* is a complex conjugate operator, (mod N) is a modulo-N operator, and |·| denotes absolute value.

8. The device according to claim 1, wherein the operations further comprise:
   generating the signal s[n] in a time domain based on a convolution $$s[n] = \sum_{m=0}^{N-1} x[m] g_{TX}[n - m],$$

where x[m] comprises the set of modulation symbols, $g_{TX}[n-m]$ is an mth cyclically shifted basis function, and wherein the basis function $g_{TX}[n]$, n=0, 1, ..., N−1, satisfies $$\sum_{n=0}^{N-1} g_{TX}[n + t(\text{mod} N)] g_{TX}^*[n] = \sum_{n=0}^{N-1} |g_{TX}[n]|^2 \cdot \delta[t],$$

where δ[k] is a Kronecker delta function δ[k]=1 for k=0 and δ[k]=0 for k≠0, m is a modulation symbol index, t is an integer, (·)* is a complex conjugate operator, (mod N) is a modulo-N operator, and |·| denotes absolute value, and wherein the basis function $g_{TX}[n]$ satisfies $$g_{TX}[n] = g_{TX}[n \pm N],$$

where N is an integer and where N is larger than or equal to a number of the set of modulation symbols.

9. The device according to claim 1, wherein the operations further comprise:
   transforming the set of modulation symbols into a frequency domain;
   filtering the set of transformed modulation symbols based on a multiplication of the set of transformed modulation symbols with a frequency domain transmit filter $G_{TX}[k]$ to obtain a frequency domain filtered signal, wherein the frequency domain transmit filter $G_{TX}[k]$ satisfies $|G_{TX}[k]|^2 = C_1$ for a frequency index k=0, 1, ..., N−1, where $C_1$ is a constant, where N is an integer, |·| denotes absolute value, and where N is larger than or equal to a number of the set of modulation symbols; and
   transforming the frequency domain filtered signal into the time domain.

10. The device according to claim 9, wherein the frequency domain transmit filter $G_{TX}[k]$ satisfies $G_{TX}[k] = \sqrt{C_1} e^{j\phi_k}$ for a sequence of real values $\phi_k$, and where $\phi_k$ is not constant for k=0, 1, ..., N−1.

11. A device for receiving a signal, comprising:
    at least one processor; and
    one or more memories including computer instructions that, when executed by the at least one processor, cause the device to perform operations comprising:
    demodulating the signal, wherein:
        the signal comprises a plurality of basis functions modulated based on a set of modulation symbols,
        the plurality of basis functions comprise cyclically shifted versions of a basis function,
        a periodic autocorrelation function of the basis function comprises a perfect periodic autocorrelation function, and
        the basis function comprises a chirp signal configured with a phase being variable based on a bivariate quadratic polynomial $p(m, n) = \alpha m^2 + \alpha n^2 - 2\alpha nm + \beta n - \beta m + \gamma$ of a modulation symbol index m and a basis function time index n=0, 1, ..., N−1, where α, β and γ are real-valued coefficients, and N is an integer.

12. The device according to claim 11, wherein the basis function comprises a Björck sequence, a Frank sequence, a generalized chirp-like sequence (GCL), a Zadoff-Chu sequence, a constant amplitude zero-autocorrelation (CAZAC) sequence, a modulatable CAZAC sequence, or a binary-to-biphase transformation of a maximum length sequence.

13. The device according to claim 11, wherein the plurality of basis functions excludes chirps generated by orthogonal chirp division multiplexing.

14. The device according to claim 11, wherein the plurality of basis functions excludes chirps generated by chirp convolved data transmission.

15. The device according to claim 11, wherein
    γ is independent of a maximum number of the plurality of basis functions, and
    where N is larger than or equal to a number of modulation symbols in the set of modulation symbols.

16. The device according to claim 11, wherein the signal comprises a sum of the plurality of modulated basis functions.

17. The device according to claim 11, wherein the operations further comprise:
reconstructing the set of modulation symbols based on a matched receive filter $g_{RX}[k]=g_{TX}^*[-k]$, wherein $g_{TX}[n-m]$ is an mth cyclically shifted basis function, and wherein the basis function $g_{TX}[n]$ satisfies $$\sum_{n=0}^{N-1} g_{TX}[n + t(\bmod N)]g_{TX}^*[n] = \sum_{n=0}^{N-1} |g_{TX}[n]|^2 \cdot \delta[t],$$

where $\delta[k]$ is a Kronecker delta function $\delta[k]=1$ for $k=0$ and $\delta[k]=0$ for $k \neq 0$, m is a modulation symbol index, and t is an integer, $(\cdot)^*$ is a complex conjugate operator, (mod N) is a modulo-N operator, $|\cdot|$ denotes absolute value, and wherein the basis function $g_{TX}[n]$ satisfies $$g_{TX}[n]=g_{TX}[n\pm N],$$

where N is an integer and where N is larger or equal to a number of the set of modulation symbols.

18. The device according to claim 17, wherein the operations further comprise:
transforming the signal into a frequency domain;
equalizing the set of modulation symbols in the frequency domain;
filtering the equalized set of modulation symbols based on a multiplication of the equalized set of modulation symbols with a frequency domain transformation $G_{RX}[k]$ of the matched receive filter $g_{RX}[k]$; and
transforming the filtered set of modulation symbols to a time domain.

19. The device according to claim 11, wherein the operations further comprise:
receiving an indication of at least one parameter of the basis function in at least one control signal or at least one control channel message; and
demodulating the signal based on the at least one parameter of the basis function.

20. A method for generating a signal, the method comprising:
obtaining a set of modulation symbols; and
modulating a plurality of basis functions based on the set of modulation symbols to generate the signal, wherein:
the plurality of basis functions comprise cyclically shifted versions of a basis function,
a periodic autocorrelation function of the basis function comprises a perfect periodic autocorrelation function, and
the basis function comprises a chirp signal configured with a phase being variable based on a bivariate quadratic polynomial $p(m, n)=\alpha m^2+\alpha n^2-2\alpha nm+\beta n-\beta m+\gamma$ of a modulation symbol index m and a basis function time index $n=0, 1, \ldots, N-1$, where $\alpha$, $\beta$ and $\gamma$ are real-valued coefficients, and N is an integer.

* * * * *